United States Patent
Gabrielson et al.

(10) Patent No.: US 11,243,794 B2
(45) Date of Patent: *Feb. 8, 2022

(54) INTERACTIVE GUI FOR BIN-PACKING VIRTUAL MACHINE WORKLOADS BASED ON PREDICTED AVAILABILITY OF COMPUTE INSTANCES AND SCHEDULED USE OF THE COMPUTE INSTANCES

(71) Applicant: Amazon Technologies, Inc., Seattle, WA (US)

(72) Inventors: Jacob Adam Gabrielson, Seattle, WA (US); Joshua M. Burgin, Seattle, WA (US); Brad Bonnett, Seattle, WA (US); Kai Fan Tang, Port Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,542

(22) Filed: Mar. 22, 2019

(65) Prior Publication Data

US 2020/0301723 A1     Sep. 24, 2020

(51) Int. Cl.
*G06F 9/455*        (2018.01)
*G06F 9/50*         (2006.01)
(Continued)

(52) U.S. Cl.
CPC ........ *G06F 9/45558* (2013.01); *G06F 9/4881* (2013.01); *G06F 9/5077* (2013.01);
(Continued)

(58) Field of Classification Search
CPC .. G06F 9/45558; G06F 9/5077; G06F 9/4881; G06F 2009/45595;
(Continued)

(56) References Cited

U.S. PATENT DOCUMENTS 6,366,945 B1    4/2002   Fong et al.
7,356,770 B1 *   4/2008   Jackson ............... G06F 9/5072
                                                           715/735
(Continued)

OTHER PUBLICATIONS

Alsadie, Deafallah, et al. "Dynamic resource allocation for an energy efficient vm architecture for cloud computing" Proceedings of the Australasian Computer Science Week Multiconference. 2018. pp. 1-8 (Year: 2018).

(Continued)

*Primary Examiner* — Michael W Ayers
(74) *Attorney, Agent, or Firm* — Nicholson De Vos Webster & Elliott LLP

(57) ABSTRACT

Techniques are described for optimizing the allocation of computing resources provided by a service provider network—for example, compute resources such as virtual machine (VM) instances, containers, standalone servers, and possibly other types of computing resources—among computing workloads associated with a user or group of users of the service provider network. A service provider network provides various tools and interfaces to help businesses and other organizations optimize the utilization of computing resource pools obtained by the organizations from the service provider network, including the ability to efficiently schedule use of the resources among workloads having varying resource demands, usage patterns, relative priorities, execution deadlines, or combinations thereof. A service provider network further provides various graphical user interfaces (GUIs) to help users visualize and manage the historical and scheduled uses of computing resources by users' workloads according to user preferences.

20 Claims, 11 Drawing Sheets

(51) Int. Cl.

| | |
|---|---|
| *G06F 9/48* | (2006.01) |
| *G06N 3/04* | (2006.01) |
| *H04L 12/24* | (2006.01) |
| *H04L 29/08* | (2006.01) |
| *G06N 3/08* | (2006.01) |
| *G06F 3/0484* | (2013.01) |
| *G06F 3/0486* | (2013.01) |

(52) U.S. Cl.
CPC ............. *G06N 3/0445* (2013.01); *G06N 3/08* (2013.01); *H04L 41/22* (2013.01); *H04L 67/36* (2013.01); *G06F 3/0486* (2013.01); *G06F 3/04842* (2013.01); *G06F 9/5027* (2013.01); *G06F 2009/4557* (2013.01); *G06F 2009/45595* (2013.01); *G06F 2209/503* (2013.01); *G06F 2209/5011* (2013.01); *G06F 2209/5014* (2013.01); *G06F 2209/5019* (2013.01); *H04L 41/147* (2013.01); *H04L 41/5009* (2013.01); *Y02D 10/00* (2018.01)

(58) Field of Classification Search
CPC ......... G06F 2009/4557; G06F 3/04842; G06F 3/0486; G06F 9/5027; G06F 2209/5019; G06F 2209/5014; G06F 2209/5011; G06F 2209/503; G06N 3/0445; G06N 3/08; H04L 41/22; H04L 67/36; H04L 41/5009; H04L 41/147; Y02D 10/00
See application file for complete search history.

(56) References Cited

U.S. PATENT DOCUMENTS

| | | | |
|---|---|---|---|
| 7,805,706 B1 | 9/2010 | Ly et al. | |
| 8,326,793 B1* | 12/2012 | Bowers | G06N 20/00 706/62 |
| 8,434,088 B2* | 4/2013 | Banerjee | G06F 11/3452 718/104 |
| 8,544,017 B1* | 9/2013 | Prael | G06F 9/5072 718/104 |
| 9,720,732 B1 | 8/2017 | Shih et al. | |
| 10,042,676 B1 | 8/2018 | Wei et al. | |
| 2007/0011683 A1* | 1/2007 | Helander | G06F 9/4887 718/104 |
| 2009/0007125 A1* | 1/2009 | Barsness | G06F 9/5077 718/104 |
| 2010/0281166 A1 | 11/2010 | Buyya et al. | |
| 2011/0185364 A1* | 7/2011 | Fernandes | G06F 9/5083 718/104 |
| 2013/0227584 A1* | 8/2013 | Greene | G06F 9/505 718/104 |
| 2015/0106520 A1 | 4/2015 | Breitgand et al. | |
| 2015/0215173 A1* | 7/2015 | Dutta | G06F 9/5038 709/226 |
| 2015/0277987 A1 | 10/2015 | Balsamo et al. | |
| 2016/0224785 A1 | 8/2016 | Wagner et al. | |
| 2016/0323377 A1 | 11/2016 | Einkauf et al. | |
| 2016/0323880 A1* | 11/2016 | Luo | H04L 41/5025 |
| 2017/0315838 A1 | 11/2017 | Nidugala et al. | |
| 2017/0323377 A1 | 11/2017 | Koo | |
| 2017/0359230 A1* | 12/2017 | Dintenfass | H04L 67/22 |
| 2018/0089324 A1 | 3/2018 | Pal et al. | |
| 2018/0210763 A1 | 7/2018 | Kumar et al. | |
| 2018/0241812 A1 | 8/2018 | Marche, I et al. | |
| 2018/0247215 A1* | 8/2018 | Garvey | G08B 21/182 |
| 2018/0349168 A1 | 12/2018 | Mohamed | |
| 2019/0243686 A1* | 8/2019 | LaBute | G06F 9/5005 |
| 2020/0042352 A1* | 2/2020 | Breitgand | H04L 47/822 |

OTHER PUBLICATIONS

Mckell, Lynn J , James V. Hansen, and Lester E. Heitger. "Charging for computing resources" ACM Computing Surveys (CSUR) 11.2 (1979): pp. 105-120. (Year: 1979).

Mohan, NR Ram, and E. Babu Raj. "Resource Allocation Techniques in Cloud Computing-Research Challenges for Applications." 2012 fourth international conference on computational intelligence and communication networks. IEEE, 2012. pp. 556-560 (Year: 2012).

Non Final Office Action, U.S. Appl. No. 16/362,545 (Atty. Docket No. 1030P64055US), Sep. 1, 2020, 21 pages.

Non-Final Office Action, U.S. Appl. No. 16/362,539 (Atty. Docket No. 1030P62298US), Aug. 13, 2020, 25 pages.

International Search Report and Written Opinion, PCT App. No. PCT/US2020/020209 (Atty. Docket No. 1030P62298WO), Jun. 16, 2020, 12 pages.

Final Office Action, U.S. Appl. No. 16/362,539 (Atty. Docket No. 1030P62298US), Feb. 24, 2021,29 pages.

Final Office Action, U.S. Appl. No. 16/362,545 (Atty. Docket No. 1030P64055US), Mar. 30, 2021,23 pages.

* cited by examiner

INTERACTIVE GUI FOR BIN-PACKING VIRTUAL MACHINE WORKLOADS BASED ON PREDICTED AVAILABILITY OF COMPUTE INSTANCES AND SCHEDULED USE OF THE COMPUTE INSTANCES

BACKGROUND

Service provider networks have enabled businesses and other organizations to more easily develop, deploy, and scale virtually any type of computing workload using various types of computing resources. Service provider networks generally provide users with the ability to use, for example, compute resources (for example, by hosting virtual machine (VM) instances or containers, executing batch jobs, executing code without provisioning servers, and so forth), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), and the like.

Modern businesses and other organizations that use such computing resources provided by service provider networks often use the resources to support a few or many separate workloads and development teams that use compute resources for different purposes. A workload generally represents any type of processing to be carried out by one or more computing systems including, for example, an application, batch job, script, or the like. As an example, a business operating a video streaming service might rely on a first workload that implements a website or other type of front-end interface, a second workload used to encode videos into various formats for use by different types of client devices, and further rely on the periodic execution of various other workloads used to generate financial reports, analyze user statistics, and the like.

BRIEF DESCRIPTION OF DRAWINGS

Various embodiments in accordance with the present disclosure will be described with reference to the drawings, in which.

DETAILED DESCRIPTION

Figure 1:
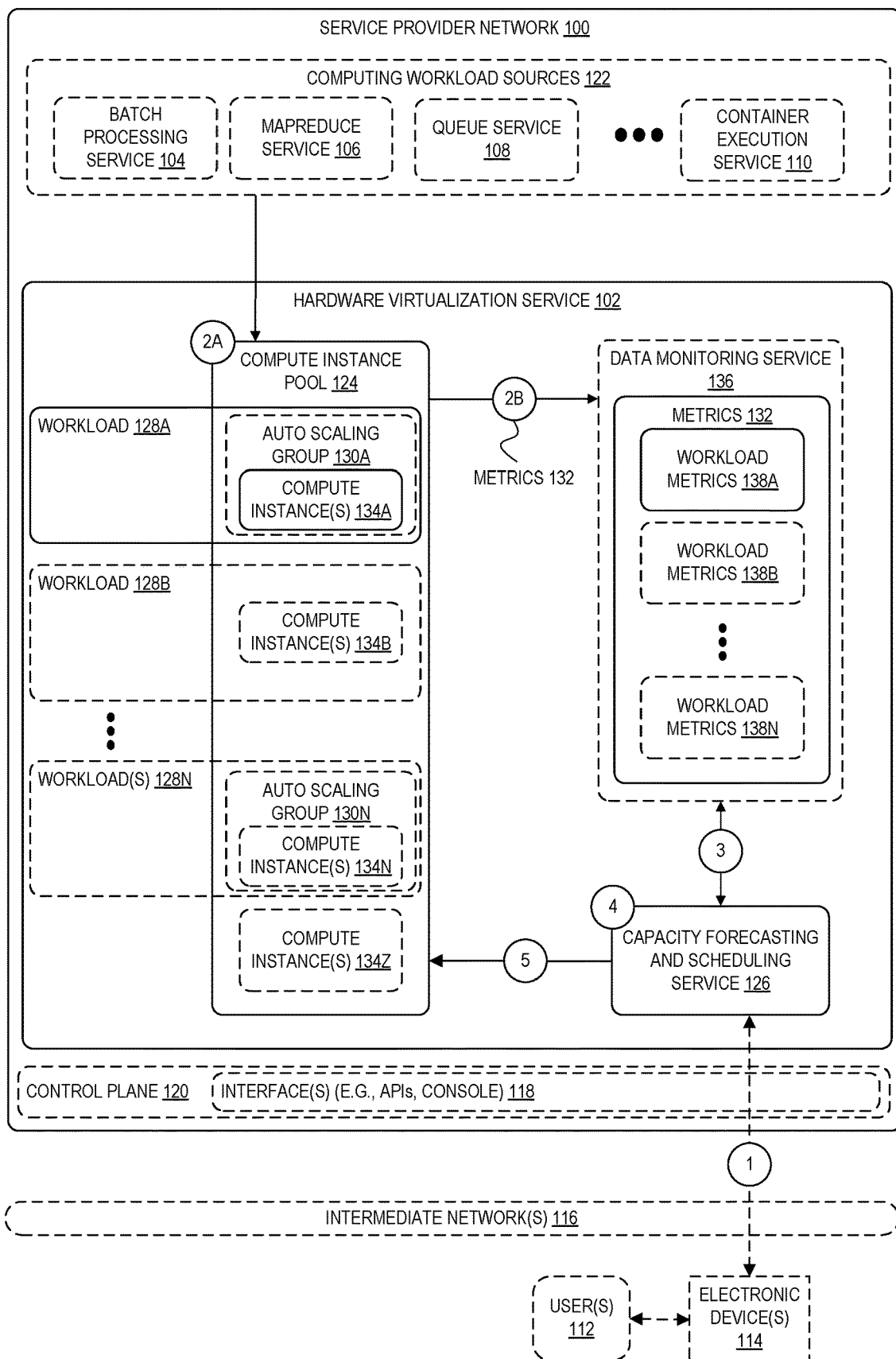
FIG. 1 is a diagram illustrating an environment for optimizing the allocation of computing resources provided by a service provider network among computing workloads associated with a user or group of users of the service provider network according to some embodiments.

Various embodiments of methods, apparatus, systems, and non-transitory computer-readable storage media are described for optimizing the allocation of computing resources provided by a service provider network—for example, compute resources such as VM instances, containers, standalone servers, and possibly other types of computing resources—among computing workloads associated with a user or group of users of the service provider network. Among other features described herein, a service provider network provides various tools and interfaces to help businesses and other organizations optimize the utilization of pools of computing resources obtained by the organizations from the service provider network, including the ability to efficiently schedule the use of the resources among workloads having varying resource demands, usage patterns, relative priorities, execution deadlines, or combinations thereof. According to some embodiments, a service provider network further provides various graphical user interfaces (GUIs) to help users visualize and manage the historical and scheduled uses of computing resources by users' workloads according to user preferences.

Service provider networks have enabled users to more easily develop, deploy, and scale workloads using various types of computing resources. Modern businesses and other organizations that use computing resources provided by a service provider network often use such resources to support many separate computing workloads and development teams that may use the provided computing resources to different ends. As used herein, a workload generally represents any type of computer processing to be carried out using obtained computing resources including, for example, software applications, batch jobs, scripts, database workloads, and the like. As an example, consider a business that operates a web-based video streaming service. Operation of the video streaming service might rely on a first workload that implements a website or other type of front-end interface that enables users to access the video streaming service and to select videos for viewing. The video streaming service might further rely on a periodically executed second workload used to encode available videos into various formats for use by different types of client devices. The business operating the video streaming service might further rely on the periodic execution of various other workloads used to generate financial and other business-related reports, to analyze user statistics, and to perform other ancillary tasks.

In the example above, each of these workloads is likely associated with different execution patterns and resource demands that can vary over time. For example, the computing resources needed to support the ongoing operation of the video streaming service's website might be significant but vary widely on a daily and/or weekly basis depending on when its customers typically access the service. The encoding processes might consume relatively less resources and execute only sporadically when new video content becomes available. Finally, the generation of business-related reports and user statistics might consume even less resources but may be deadline-driven in some cases to meet business needs. In these and many other situations, organizations are often faced with the challenges of determining and obtaining an appropriate amount of computing resources to devote to each of the various workloads and scaling the obtained resources for each workload as demand changes over time.

An organization tasked with obtaining computing resources used to execute various workloads as in the example above might typically obtain one or more separate pools of computing resources from a service provider network to support each of the workloads. For example, an organization might obtain a first pool of "reserved" compute instances to support execution of a first workload, a second smaller pool of reserved compute instances to support execution of a separate second workload, and use "on-demand" compute instances to support execution of additional workloads. Here, a reserved compute instance generally represents a reservation of compute capacity from a service provider network for a defined period of time (for example, a 1-year or 3-year term), typically at a lower cost compared to uses of on-demand or other types of compute instances.

Users of a service provider network can also use "auto scaling" functionality to scale an amount of computing resources (for example, a number of compute instances) used by various workloads. Auto scaling services typically operate, for example, by monitoring the health and performance of compute instances or other computing resources used to support execution of one or more workloads, replacing impaired instances with new instances when needed, and dynamically scaling a number of instances used based on defined scaling conditions. A pool or "fleet" of auto scaling compute instances made available to a workload, for example, generally can include any number of available VM instances, container instances, or other types of computing resources that can be used to support execution of a workload. The use of auto scaling functionality can be based in part on user-specified auto scaling policies that define, for example, conditions for automatically increasing computing resource capacity during demand spikes to maintain performance and automatically decreasing capacity during lulls to reduce resource waste and cost.

In some embodiments, users can create "auto scaling groups" of computing resources using an auto scaling service of a service provider network. An auto scaling group, for example, can be associated with one or more pools of computing resources, one or more workloads to use the computing resource pools, and one or more auto scaling policies, which are typically configured to monitor and scale available computing resources based on one or more resource load metrics associated with the workload(s) (for example, central processing unit (CPU) utilization, graphics processing unit (GPU) utilization, input/output (I/O) latency, or combinations thereof). If resource demands for a workload exhibit a predictable pattern, users can also schedule scaling activities, for example, to automatically increase capacity available to an auto scaling group during weekdays and decrease capacity during weekends, if such a pattern matches typical resource demands.

While service provider networks enable users to easily provision and scale computing resources used to host and execute workloads using the tools described above, it often remains challenging for organizations to make optimal use of provisioned pools of computing resources. Consider again the example of an organization that purchases a pool of reserved compute instances for some period of time (e.g., a one-year term, a three-year term) to ensure that sufficient compute capacity is always available to support operation of its video streaming service website. Due to the cyclical nature of when the video streaming service's customers typically interact with the service (for example, more often in the evenings and on weekends), the entire capacity available in the compute instance pool may be fully utilized only on rare occasions and thus many hundreds or thousands of available compute instance hours may go unused on a daily and weekly basis. Although these unused computing resources potentially could be used by the organization's other workloads (for example, to perform encoding tasks, generate business reports and user statistics, and so forth), existing service provider networks generally lack features that enable users to easily share such computing resource pools among different teams and workloads within an organization. An organization could instead elect to use on-demand resources for these workloads, however, on-demand resources are typically associated with a higher cost compared to reserved computing resources and do not guarantee the availability of resources when they are needed.

To address these and other issues, according to embodiments described herein, a service provider network provides capacity forecasting and scheduling services that enables users to optimize the use of pools of computing resources among any number of workloads with varying resource demands, resource usage patterns, workload priorities, execution deadlines, or any combinations thereof. Referring again to the example of a video streaming service, a capacity forecasting and scheduling service can be used to monitor a first workload's use of a reserved pool of compute instances (for example, the workload implementing the service's website), learn and be able to predict how the first workload's usage patterns vary over time, and intelligently allocate excess computing resources to one or more other secondary workloads in a way that minimizes disruptions to the first workload for which the resources were primarily obtained. In some embodiments, the capacity forecasting and scheduling service can be further used to monitor computing resource usage patterns of existing workloads and to schedule additional, possibly deadline-driven, workloads into future time slots that are predicted to have sufficient available capacity to support execution of the additional workloads. Furthermore, embodiments of a capacity forecasting and scheduling service described herein includes various GUIs and other interfaces that enable users to view historical usage patterns of one or more computing resource pools, to view and manage scheduled uses of capacity expected to be available from computing resource pools, and/or to perform other capacity management operations. Among other benefits, capacity management features of embodiments described herein generally enable more efficient use of computing resources available to a user or group of users and improve organizations' ability to manage the execution of any number of separate workloads, thereby reducing computing time (and computing resource usage generally), power usage, and possibly expense.

FIG. 1 is a diagram illustrating an environment for optimizing the allocation of computing resources provided by a service provider network 100 among computing workloads associated with a user or group of users of the service provider network according to some embodiments. In some embodiments, a hardware virtualization service 102, a batch processing service 104, a MapReduce service 106, a queue service 108, a container execution service 110, among any number of other possible services, operate as part of a service provider network 100 and each comprises one or more software modules executed by one or more electronic devices at one or more data centers and geographic locations. User(s) 112 using one or more electronic device(s) 114 (which may be part of or separate from the service provider network 100) can interact with the various services of the service provider network 100 via one or more networks, such as the internet.

As indicated above, a service provider network 100 provides users with the ability to utilize one or more of a variety of types of computing-related resources such as compute resources (for example, executing VM instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service 102 that can execute compute instances, a storage service that can store data objects, and so forth. The users (or "customers") of service provider networks 100 may utilize one or more user accounts that are associated with a customer account, though these terms may be used somewhat interchangeably depending upon the context of use. Users may interact with a service provider network 100 across one or more intermediate networks 116 (for example, the internet) via one or more interface(s) 118, such as through use of application programming interface (API) calls, via a console implemented as a website or application, etc. The interface(s) 118 may be part of, or serve as a front-end to, a control plane 120 of the service provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting a computing job or code to be executed by the provider network, which in turn utilizes one or more compute instances to execute the job or code, typically without the user having any control of or knowledge of the underlying compute instance(s) involved.

As indicated above, it is often desirable for users to optimize the use of pools of computing resources obtained from a service provider network 100 among various workloads associated with the users. Consider again an example business organization with several different divisions or development teams that are each associated with one or more computing workloads. A first development team, for example, might manage a large database for the organization that is associated with a steady-state workload and, for these purposes, the team has obtained a few storage-optimized instances from a hardware virtualization service 102 of the service provider network 100 to host the database. A second team might manage a website and middle-tier services for the organization, where this workload is typically in relatively heavy use during business hours but used less heavily outside of business hours. In this example, the second team uses the hardware virtualization service 102 to obtain a pool of one thousand (1,000) reserved compute instances to support operation of the website and middle-tier services. Furthermore, since demand for the website fluctuates on a daily and weekly basis, the team has created and associated an auto scaling group with the website workload so that the number of compute instances used to support the website is increased during period of high demand but reduced during off-peak hours when such resources would be otherwise wasted.

Figure 2:
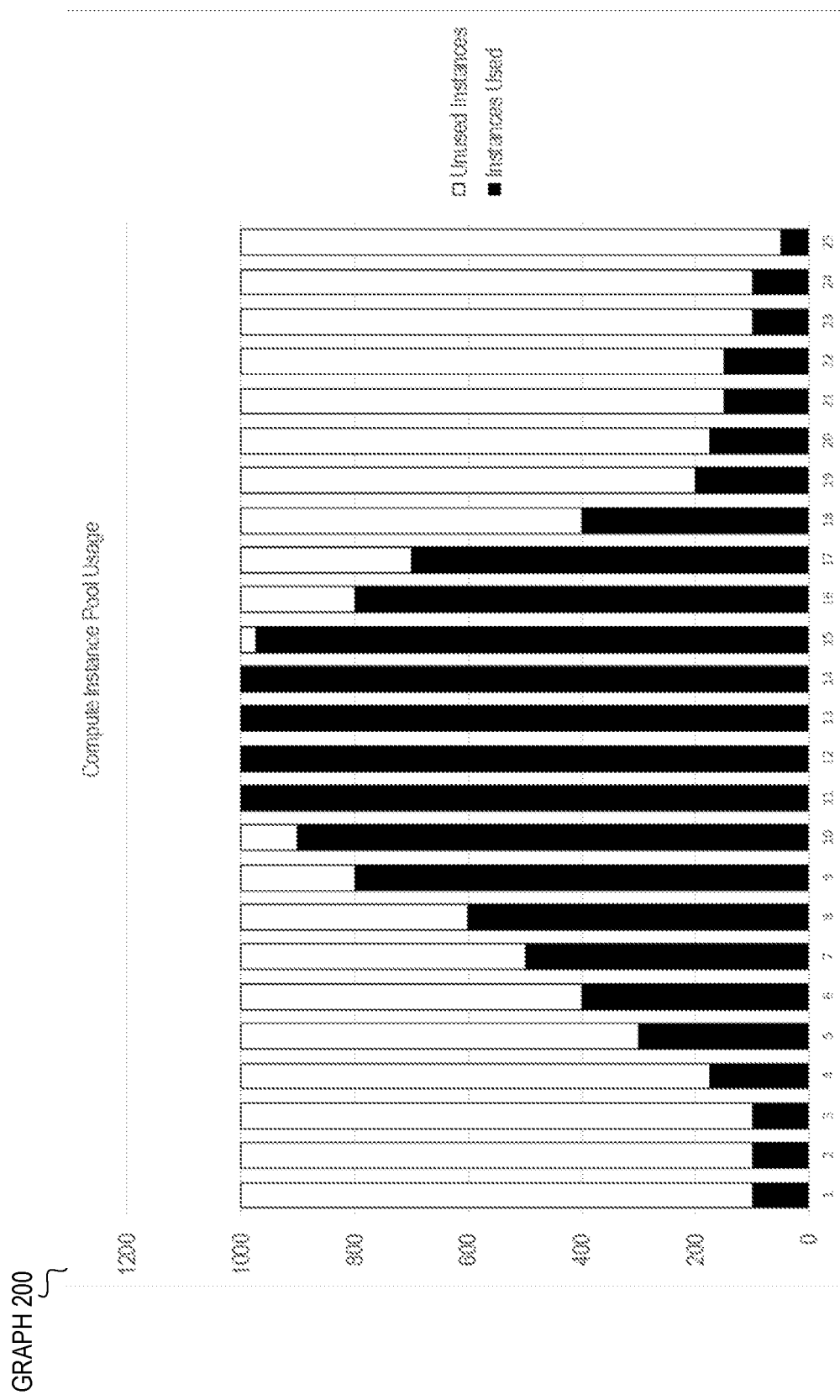
FIG. 2 is a graph illustrating a computing workload's use of compute capacity provided by a compute instance pool according to some embodiments.

FIG. 2 is a graph illustrating a computing workload's use of compute capacity provided by a compute instance pool, as described in the example above. The graph 200, for example, illustrates use of a pool of 1,000 reserved compute instances by a single workload associated with an auto scaling group (for example, a workload supporting operation of an organization's website as described above), where each entry on the x-axis corresponds to an hour of day and the size of each black bar in the y-axis represents a number of instances used during that hour. As illustrated in graph 200, the example workload uses relatively few compute instances from the compute instance pool in the early morning and late evening but uses nearly the entire available capacity during the middle of the day. The graph 200 illustrates that for such cyclical workloads a significant amount of capacity can go unused each day, which can amount to an even more significant amount of unused capacity over a term for which a pool of compute instances is reserved.

The example shown in FIG. 2 illustrates the use of a compute resource pool by a defined workload. In some embodiments, a workload that uses such computing resources can originate from any of a number of workload sources including, for example, other services of the service provider network 100, a separate workload source created by a user, or any other source of executable software that can make use of computing resources. Referring again to FIG. 1, example computing workload sources 122 shown include a batch processing service 104, a MapReduce service 106, a queue service 108, a container execution service 110, among any number of other possible workload sources.

As indicated above, one example of a computing workload source 122 is a batch processing service 104. A batch processing service 104 generally enables users to execute queues or batches of compute jobs without manual intervention. In some embodiments, a batch processing service 104 uses other services of a service provider network 100 to execute compute jobs. For example, depending on the specifics of the compute jobs to be executed, a batch processing service 104 can use one or more compute instances provided by a hardware virtualization service 102, execute one or more container instances using a container execution service 110 (which itself uses compute instances provided by a hardware virtualization service 102), use one or more databases provided by a database service, or use any other types of computing resources or combinations thereof.

A batch processing service 104 enables users to specify various types of compute jobs desired for execution by the batch processing service 104. In response to receiving new compute job requests, the batch processing service 104 uses various processes to plan, schedule, and execute the requested compute jobs by provisioning a quantity and type of compute resources (for example, CPU-optimized or memory-optimized compute instances) based on the estimated resource requirements of the compute jobs submitted. Once execution of requested compute jobs is completed, the batch processing service 104 typically scales down the resources used to execute jobs and awaits receipt of additional compute job requests.

A compute job executed by a batch processing service 104 generally can be any unit of computing work (such as a shell script, an executable, or a container image) that a user submits to the batch processing service 104 for execution. Each submitted compute job may include configuration information specifying, for example, a name or other identifier of the job, the job's memory and processing requirements, and an identifier of a location where the compute job is located (for example, a location of a shell script, executable, or container image). In some examples, compute jobs submitted to a batch processing service 104 can be executed as containerized applications running on compute instances in a defined compute environment. Compute jobs can also reference other jobs by name or by identifier and can be dependent on the successful completion of other jobs. A compute job can be described using a job definition, which describes the job to be executed including any parameters, environmental variables, compute requirements, and other information that is used to execute a compute job. Referring to FIG. 1, in some instances, compute jobs submitted to a batch processing service 104 (for example, using a web-based console or other interface provided by the service) can be executed as one or more workloads using one or more compute instances of a compute instance pool 124.

In some embodiments, another example of a computing workload source 122 is a queue service 108. A queue service 108, for example, can be used to create queues of compute jobs or other types of computing workloads that similarly can be executed using compute instances of a compute instance pool 124. Other examples of workload sources include a MapReduce service 106 and container execution service 110, each of which similarly can be configured to carry out various types of workloads (for example, MapReduce jobs or container executions) using compute instances from a compute instance pool 124 in some instances. As described in more detail herein, such workloads can be identified to a capacity forecasting and scheduling service 126 using interfaces provided by the capacity scheduling service or by the respective services according to various embodiments. In some embodiments, the identification of workloads configured at various services of a service provider network 100 can be based on user-generated "tags," or labels, assigned to resources used to execute various workloads. For example, a user might associate a "video encoding" with one or more batch jobs that implement video encoding processes, associated a "web app" tag with one or more VM images used to implement a web application, and so forth.

As indicated above, the compute instances of a compute instance pool 124 used by one or more of the workloads 128A-128N can be associated with one or more respective auto scaling groups—for example, auto scaling group 130A may be associated with workload 128A, and auto scaling group 130N may be associated with workload 128N. In some embodiments, an auto scaling group defines a logical pool, or fleet, of compute instances that may share similar characteristics and can be treated collectively for the purposes managing and scaling the group of instances. For example, if a workload 128A executes across multiple instances of an auto scaling group 130A, it may be desirable at times to increase the number of instances in that group to improve the performance of the workload or to decrease the number of instances to reduce costs when demand is low (as illustrated by the example shown in FIG. 2). As further indicated above, an auto scaling group can be associated one or more auto scaling policies that define conditions for automatically scaling up or scaling down the number of instances available in the group. To enable such scaling, in some embodiments, some or all of the compute instances of a compute instance pool 124 can be configured to collect and to send various performance metrics 132 that enable a scaling process to determine when to scale the size of a corresponding auto scaling group, for example, by comparing the obtained metrics to one or more corresponding auto scaling policies.

In FIG. 1, one or more workloads (for example, workloads 128A-128N) are executed using compute resources (for example, VMs, containers, standalone servers, or any other type of compute capacity) provided by a hardware virtualization service 102 or other service and obtained by a user of the service provider network 100. Referring again to an example video streaming service, a workload 128A might implement an application front-end, workload 128B might implement various video encoding operations, and various other workload(s) 128N might implement report generation, user statistics analysis, and other auxiliary processes. In the example above, each of the workloads 128A-128N might be associated with and managed by a different user or group of users associated with a same organization such as a business organization or other entity.

As shown in FIG. 1, each of the workloads 128A-128N executes on some number of compute instances of the hardware virtualization service 102 (for example, workload 128A runs on compute instance(s) 134A, workload 128B runs on compute instance(s) 134B, and workload(s) 128N run on compute instance(s) 134N, while compute instance(s) 134Z represent compute instances presently unused by any particular workload). In this example, each compute instance of the compute instance pool 124 can host a separate instance of a respective workload, for example, as a separate instance of a corresponding application or other executable running on a VM or container instance. In some embodiments, the compute instances executing a workload can be hosted on any number of computing devices—for example, each of the compute instance(s) 134A can be hosted by a separate computing device or, in some cases, a computing device can host two or more compute instances 134A. As described above, the number of compute instances used for one or more of the workloads initially can be selected and provisioned based on expected resource demands for each of the separate workloads.

In some embodiments, a service provider network 100 offers a variety of compute instance types each having different resource capacities, and a type of compute instance used various workloads can be selected further based on an expected type of workload. For example, compute instances associated with greater CPU capacity can be provisioned for a more CPU-intensive workload, while compute instances associated with greater GPU capacity can be provisioned for a different workload that is typically more GPU-intensive. Although only a single compute instance pool 124 is shown in FIG. 1, a user or group of users of a service provider network can create any number of separate compute instance pools, each possibly associated with different types or amounts of compute instances or other computing resources.

In some embodiments, some of all the compute instances of a compute instance pool 124 are configured to periodically emit or otherwise send various performance metrics 132 to a data monitoring service 136 of the service provider network 100. A data monitoring service 136 collects monitoring and operational data in the form of logs, metrics, and events, related to virtually any type of computing resource of a service provider network 100. As described hereinafter, in some embodiments, metrics 132 collected by a data monitoring service 136 from compute instances of a compute instance pool 124 can be used by a capacity forecasting and scheduling service 126 to determine an amount of compute capacity from a compute instance pool 124 used by each of various workloads (for example, workloads 128A-128N) over time and to make predictions about future resource usage patterns by various workloads. Although the data monitoring service 136 is shown as part of the hardware virtualization service 102 in FIG. 1, in other examples, the data monitoring service 136 may be part of a different service or provided as an independent service of the service provider network 100. In some embodiments, metrics may be collected and stored separately for each workload (for example, stored as workload metrics 138A corresponding to workload 128A, workload metrics 138B corresponding to workload 128B, and workload metrics 138N corresponding to workload 128N, and so forth), for example, where each workload can be associated with a separate "namespace" used to identify the workload's metrics at the data monitoring service 136.

In some embodiments, at the circle labeled "1" in FIG. 1, a user uses one or more electronic device(s) 114 to generate and send a request to enable optimized capacity scheduling of a compute instance pool for workloads originating from one or more workload sources. For example, a user 112 may interact with a capacity forecasting and scheduling service 126 of a hardware virtualization service 102 via a web-based console, command-line interface, or other provided interface. In other examples, a user 112 can enable optimized capacity scheduling for one or more workloads via a separate service of the service provider network 102 and that may be integrated with the capacity forecasting and scheduling service 126 (for example, via an interface associated with a batch processing service 104, container execution service 110, or any other service that is able to make use of capacity provided by a compute instance pool 124 or other pool of computing resources). In some embodiments, a capacity forecasting and scheduling service 126 is a separate service of a service provider network 100, while in other embodiments the capacity forecasting and scheduling service 126 can be a component of a hardware virtualization service 102 or any other service of the service provider network 100.

In some embodiments, a capacity forecasting and scheduling service 126 generally enables users to identify workloads associated with the users, to manage which workloads have access to capacity available in a compute instance pool 124, to prioritize the workloads' access to available capacity, and to manage other aspects of how capacity available in a compute instance pool 124 is allocated (or how pools of other types of computing resources are allocated). As one example, a user 112 can use an interface associated with a capacity forecasting and scheduling service 126 to view historical data related to the use of compute instances in a compute instance pool 124 by a primary workload over time, determine that excess compute instances in the compute instance pool 124 are periodically available for use (for example, as illustrated by the example of FIG. 2), identify one or more additional workloads originating from one or more computing workload sources 122, and provide input indicating a desire for the additional workload(s) to use the available capacity in a compute instance pool 124 when possible.

In some embodiments, a capacity forecasting and scheduling service 126 enables users to associate priorities with workloads to be managed by the service. For example, a workload for which a compute instance pool 124 was primarily obtained can be assigned a highest priority and have first access to available capacity when it is requested by the workload (for example, where the capacity may be requested by an auto scaling group associated with the workload or by a separate service of the service provider network 100 that executes the workload). Other workloads can be assigned progressively lower priorities depending on a relative importance of the workloads to a user or organization managing multiple separate workloads, where workloads at each priority level may be provided with available compute capacity only if requests for capacity from workloads with higher priorities are currently satisfied and there is remaining available capacity in the pool.

In some embodiments, use of a capacity forecasting and scheduling service 126 can be permission-based such that users' ability to configure workload priorities and other settings can be governed within an organization. For example, one or more select users of a capacity forecasting and scheduling service 126 within an organization can be associated with administrative privileges that enable the users to set workload priorities and other configurations. The use of such permissions can enable a system administrator or other higher-level user associated with an organization to determine priorities across possibly many separate users or groups of users within an organization (for example, teams of users within an organization associated with various respective business units or software development projects) to avoid scenarios, for example, where many users assign a highest priority to their own respective workloads.

In some embodiments, a capacity forecasting and scheduling service 126 maintains a "workload" table (or other data structure as known to those of skill in the art) representing workloads that a user or various groups of users have identified as candidates for use of capacity from a compute instance pool 124. Each entry in a workload table, for example, may include an identifier of a workload (possibly including an indication of how to access an executable application or other computing resources used to execute the workload), an indication of the workload's priority, any execution deadlines associated with the workload, and/or other workload profile information indicating, for example, a number of compute instances expected to be used by the workload, an expected execution duration for the workload (for example, indicated as a number of CPU minutes or hours typically used to complete execute of the workload), memory requirements associated with the workload, a preferred type of compute instance used to execute the workload, and the like.

In some examples, users may not specify or have access to complete profile information for one or more workloads identified to a capacity forecasting and scheduling service 126. For example, a user may not know how long a particular workload typically takes to execute, how many compute instances are typically used by a workload, or whether a workload is associated with any deadlines. In some embodiments, a capacity forecasting and scheduling service 126 automatically monitors workloads associated with a user account or group of user accounts and can automatically identify and learn various profile attributes associated with the workloads. For example, in some embodiments, a capacity forecasting and scheduling service 126 can obtain metrics 132 collected by a data monitoring service 136 and use machine learning (ML) or other statistical techniques to learn various attributes associated with users' workloads such as, for example, resource usage and scaling information, execution durations, and so forth. The monitoring of users' workloads can be performed automatically in some cases or based on user input requesting the monitoring of one or more identified workloads.

In some embodiments, the monitoring of workloads can also be used to learn how long it typically takes for workloads to launch new compute instances and to become fully operational. For example, if a user has a workload that implements a web application, a capacity forecasting and scheduling service 126 might monitor executions of the web application and determine that it take approximately five minutes on average to launch a new compute instance used to execute an instance of the web application, to warm up associated caches, and to perform other application start up processes before the instance is fully operational. A capacity forecasting and scheduling service 126 can also monitor the performance of auto scaling groups to determine how long it typically takes to scale up and scale down resources and to determine whether these scaling rates change over time. As described in more detail hereinafter, such information can be used by the capacity forecasting and scheduling service 126 to better predict future capacity availabilities and to more accurately schedule workloads with associated execution deadlines and other attributes, among other uses.

In some embodiments, a capacity forecasting and scheduling service 126 can also assist users by automatically identifying workloads that may be well-suited for sharing computing resource pool capacity. For example, a capacity forecasting and scheduling service 126 can analyze metrics 132 or use other processes to identify auto scaling groups or workloads that exhibit scaling patterns which often result in periods of available capacity. In this example, a capacity forecasting and scheduling service 126 can provide an interface that indicates an amount of compute instance pool capacity used by various auto scaling groups or workloads over time, including an indication of what types of compute instances are available and at what times such instances are typically available for use by other workloads. In some embodiments, the capacity forecasting and scheduling service 126 can further identify, for one or more existing auto scaling groups or workloads, other auto scaling groups or workloads that are associated with capacity usage patterns that align with the auto scaling group or workload in such a way that capacity could be shared efficiently (for example, an auto scaling group that typically scales out during the day and scales down at night can be matched with one or more other auto scaling groups that typically scale out at night and scale down during the day). In this example, a user can provide input linking one or more identified auto scaling groups and/or workloads that the user desires to have share a pool of computing resources, the input including relative priorities among the auto scaling groups and/or workloads and so forth.

In some embodiments, a capacity forecasting and scheduling service 126 can further assist users with scheduling uses of compute capacity by various workloads at future points in time. The scheduling of workloads' access to future available compute capacity can be based on predictions made about use of available compute capacity by one or more existing workloads, profile information associated with workloads to be scheduled to use the excess capacity (for example, including expected resource demands, priorities, execution deadlines, and so forth), and other user preferences as described above. The scheduling and management of future uses of compute capacity is described in more detail herein, for example, with respect to FIG. 3 and FIG. 4.

Figure 3:
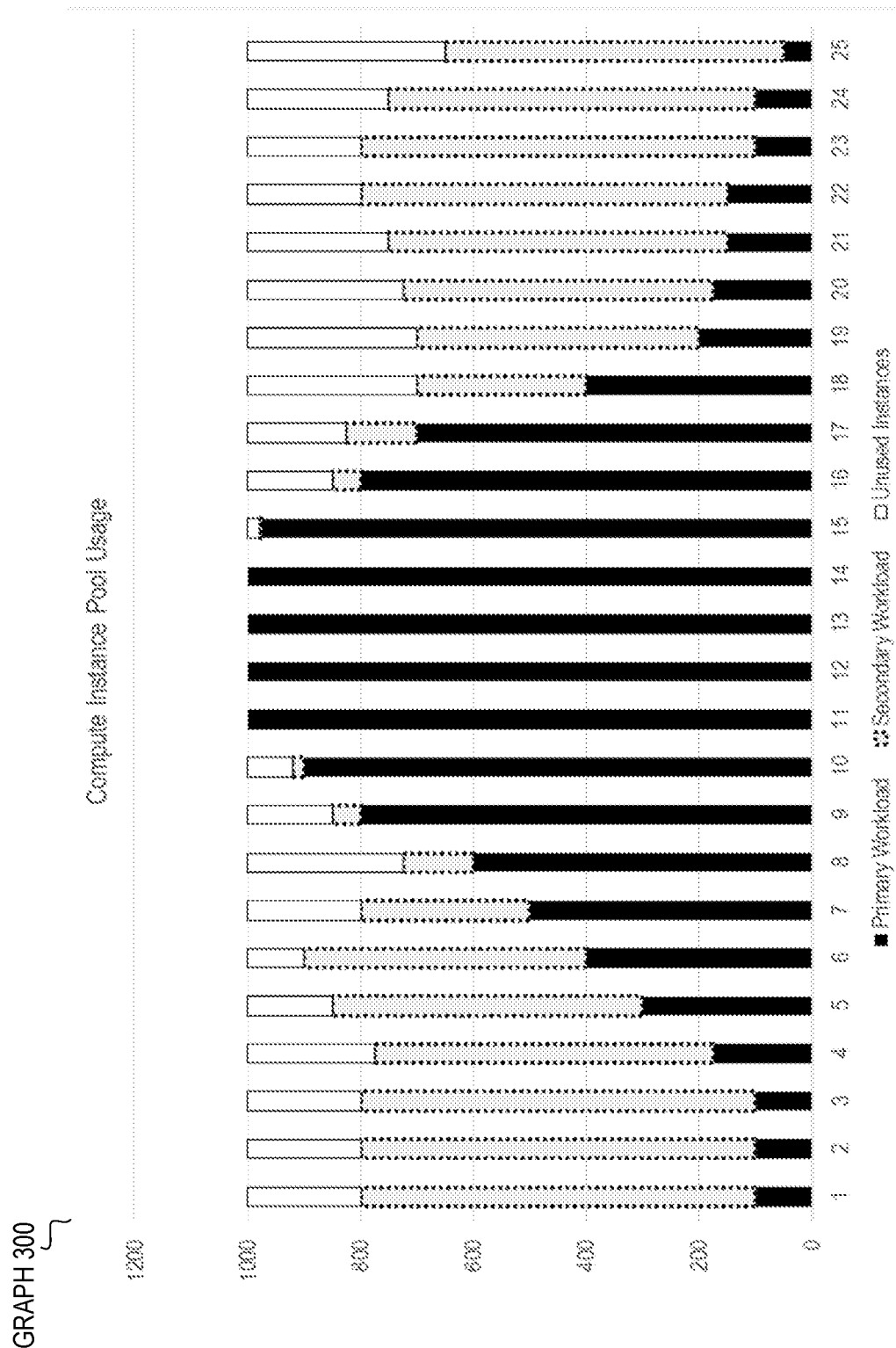
FIG. 3 is a graph illustrating two separate computing workloads sharing compute capacity provided by a compute instance pool according to some embodiments.

FIG. 3 is a graph illustrating two separate computing workloads sharing compute capacity provided by a compute instance pool according to some embodiments. FIG. 3 is similar to FIG. 2 in that it illustrates a number of compute instances of a pool of 1,000 reserved compute instances used by a primary workload over a 24-hour period, illustrated by the dark bars in the graph. The example shown in FIG. 3 further illustrates use of excess capacity available in the compute instance pool by a secondary workload during periods of time when the primary workload is not using the entire capacity, the secondary workload's use of compute instances illustrated by the shaded bars in broken lines.

In the example shown in FIG. 3, a user associated with the workloads has identified the primary workload as a highest priority workload and further associated the secondary workload with a lower priority for access to compute instances from the associated compute instance pool. The primary and secondary workloads may have been identified, for example, based on their association with respective auto scaling groups, or by their origination from one or more workload sources 122. Based on the identification of the workloads and the associated workload priorities, the capacity forecasting and scheduling service 126 is able to automatically increase and decrease a number of compute instances available to the secondary workload over time based at least in part on a determined number of compute instances currently in use by the primary workload. As illustrated in FIG. 3, for example, the secondary workload is shown using a portion of the available compute instances during the time period early in the day and at night when the primary workload is using only a portion of the total compute capacity. Although only a single primary and single secondary workload is shown in FIG. 3, in general, any number of additional workloads can be provided with the excess capacity according to assigned workload priorities and other factors.

As indicated above, in some embodiments, the scaling up and scaling down of additional workloads by a capacity forecasting and scheduling service 126 can include taking into account predictions made about the future use of compute instance pool resources by various workloads. In FIG. 3, for example, a capacity forecasting and scheduling service 126 can monitor and analyze the usage patterns of the primary workload to make predictions about how much capacity the primary workload is likely to use at points in time in the future. Among other purposes, this information can be used to influence the scaling of the secondary workload to minimize disruptions to the higher priority primary workload. For example, if the capacity forecasting and scheduling service 126 determines that the primary workload is likely to increase its capacity in the near future based on past usage patterns and the workload typically takes some amount of time to launch new compute instances and warm up, the capacity forecasting and scheduling service 126 can start scaling down the capacity made available to the secondary workload sufficiently far ahead in time such that the primary workload can scale up according to its normal patterns. In some embodiments, if a user has indicated that a workload is not fault tolerant and is to run to completion but the capacity forecasting and scheduling service 126 needs to scale down its associated capacity, the capacity forecasting and scheduling service 126 can generate a notification requesting input indicating whether the user prefers for the workload to be terminated or moved to other capacity (for example, to on-demand capacity or capacity available from a different compute instance pool).

With reference to FIG. 1, in some embodiments, at circle "2A" one or more workloads associated with one or more user accounts execute using compute instances from a compute instance pool 124. As shown in FIG. 1, the workloads 128A-128N execute using compute instances 134A-134N available from a compute instance pool 124. As indicated above, the workloads 128A-128N can originate from any number of computing workload sources 122. Furthermore, execution of each of the workloads 128A-128N can involve scaling of the associated capacity over time, possibly based on associated auto scaling groups, according to the capacity management processes described herein.

In some embodiments, at circle "2B," some or all the compute instances of the compute instances of the compute instance pool 124 optionally obtain and periodically send utilization metrics to a data monitoring service 136. As indicated above, the reported metrics 132 can be analyzed and used, for example, to learn historical usage patterns of various workloads, to monitor ongoing usage of the compute instance pool 124 capacity, and to make predictions about future usage patterns for one or more workloads 128A-128N, among other possible uses.

In some embodiments, at circle "3" in FIG. 1, a capacity forecasting and scheduling service 126 obtains historical data for one or more workloads for one or more past time windows. The capacity forecasting and scheduling service 126 can be configured to obtain the metrics on a periodic basis (which can be based on a default period, configured by a user, and/or adaptively based on detected workload activity over time) or in response to a request to measure a current workload or compute instance pool 124 status. In some embodiments, the capacity forecasting and scheduling service 126 can obtain the metrics for a particular workload or auto scaling group based on a namespace with which the metrics have been associated, as indicated above.

In some embodiments, at circle "4," the capacity forecasting and scheduling service 126 schedules use of capacity from a compute instance pool 124 by one or more identified workloads. As indicated above, a capacity forecasting and scheduling service 126 can be used to schedule the execution of workloads at future points in time based on predicted computing resource availabilities, expected workload demands, expected workload execution durations, workload priorities, workload deadlines, among other possible factors or combinations thereof.

In some embodiments, a capacity forecasting and scheduling service 126 can generate predictions of compute capacity usage using any of a variety of different techniques including autoregressive models, machine learning (for example, based on recurrent neural networks (RNNs) or other time series forecasting models), or other forms of predictive modeling and probabilistic forecasting known to those of skill in the art. In some embodiments, a capacity forecasting and scheduling service 126 uses a separate ML service of the service provider network 100 to create ML-based models of capacity usage for various workloads. The training of such models, for example, can be based on using windows (e.g., 2 weeks) of historic time series data, where the models can be updated over time (or completely regenerated) as more data becomes available. In some embodiments, capacity usage predictions can be probabilistic and used to provide users with an indication of how likely future scheduled uses of compute capacity are to be satisfied based on historic trends.

Figure 4A:
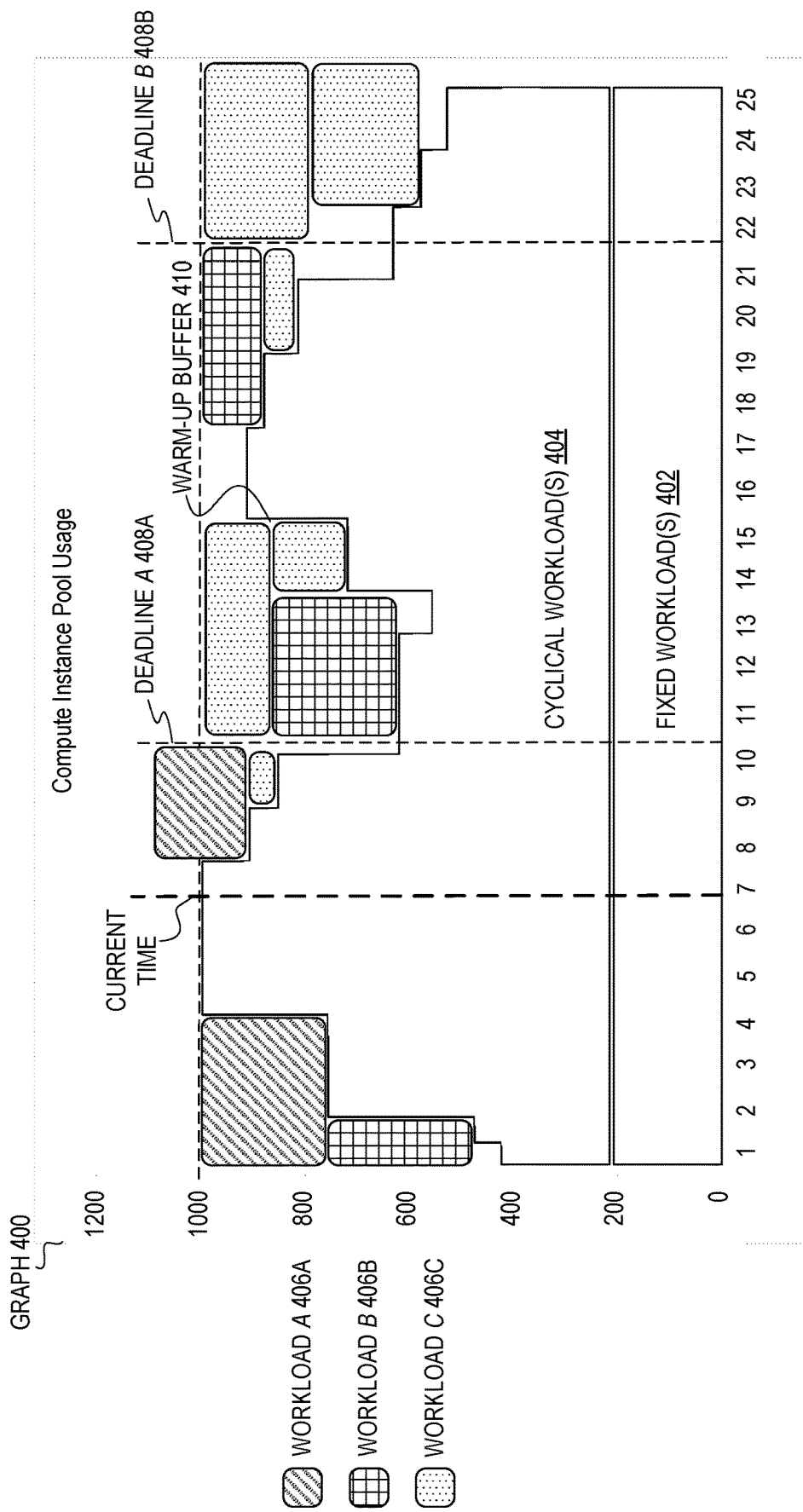
FIG. 4A is a graph illustrating historical and scheduled uses of compute capacity provided by a compute instance pool among a plurality of computing workloads associated with a user or group of users of a service provider network according to some embodiments.

FIG. 4A is an example graph illustrating historical and scheduled uses of compute capacity provided by a compute instance pool among a plurality of computing workloads associated with a user or group of users of a service provider network according to some embodiments. The graph 400 illustrated in FIG. 4A, for example, again shows usage of a compute instance pool comprising 1,000 available compute instances. As illustrated, the use of these compute instances is shared among one or more fixed workloads 402, one or more cyclical workloads 404, and various other workloads including a workload A 406A, a workload B 406B, and a workload C 406A.

In this example, the one or more fixed workloads 402 represents steady-state workloads that uses a same number of compute instances over time. The cyclical workload(s) 404, on the other hand, represents workloads that exhibits a pattern of relatively high resource usage during some time periods and relatively low resource usage during other time periods. One or more cyclical workloads 404, for example, may be associated with respective auto scaling groups that manage a number of compute instances available to the workloads over time.

The graph 400 further illustrates scheduling uses of available compute capacity by additional workloads during time periods of expected low utilization of the compute instance pool by the fixed workload(s) 402 and cyclical workload(s) 404. As shown in the graph, each of workload A 406A, workload B 406B, and workload C 406C is scheduled to use some portion of the capacity expected to be available at various points in time. In some embodiments, a capacity forecasting and scheduling service 126 packs the workloads into the periods of expected resource availability based on attributes associated with each of the workloads (for example, as stored in a workload table as described above), where workloads may be scheduled to use an amount of capacity based at least in part on one or more of: an amount of compute capacity requested or expected to be used by each workload, a relative priority associated with each workload, types of resources used by each workload, and so forth. For example, a workload A 406A can be scheduled to use up to 100 compute instances tomorrow from approximately 11:00 AM until 3:00 PM, workload B 406B can be scheduled to use up to 75 instances from approximately 6:00 PM until 10:00 PM, a workload C 406C can use as many instances as are available from 10:00 PM onward, and so forth. In some embodiments, each of the scheduled uses can be stored in a workload table as described above or in any other type of data store accessible to the capacity forecasting and scheduling service 126. As illustrated by the warm-up buffer 410, the scheduling of the additional workloads can be performed in a manner that attempts to minimize disruptions to other higher priority workloads. For example, if the capacity forecasting and scheduling service 126 determines that the cyclical workload(s) 404 are likely to increase capacity use at a time in the future based on past usage patterns and the cyclical workload(s) 404 typically take some amount of time to launch new compute instances and warm up, the capacity forecasting and scheduling service 126 can start scaling down the capacity made available to the additional workloads ahead in time such that the cyclical workload(s) can scale up according to normal patterns.

The example in FIG. 4 illustrates that it may at times by possible to satisfy a workload's request for capacity only partially. For example, workload A 406A is shown as being scheduled into a capacity slot where the number of instances to be used by the workload exceeds the total number of instances in the compute instance pool. In this example, the workload can be assigned on-demand instances or instances from a different pool to satisfy the additional requested capacity. In some embodiments, a user can specify whether they desire for a workload to use capacity from a pool if the request cannot be fully satisfied, or the capacity forecasting and scheduling service 126 can generate a notification requesting a user to indicate whether the user prefers for the workload to use additional on-demand capacity or have the workload wait to be scheduled at a time in the future when the workload's demand can be fully satisfied.

The graph further illustrates the scheduling of workloads relative to execution deadlines associated with the workloads. For example, the graph 400 illustrates the existence of a first deadline A 408A associated with workload A 406A and a second deadline B 408B associated with workload B 406B. As illustrated, the associated workloads are packed into the capacity schedule in such a way that execution of the workloads is expected to complete prior to the associated deadlines. Although only one deadline is illustrated for each of the workloads, in general, a workload can be associated with any number of recurring or sporadic deadlines as specified by a user or learned by the capacity forecasting and scheduling service 126. Similar to above, if a capacity forecasting and scheduling service 126 is unable to schedule a workload at a time slot that is expected to meet an associated execution deadline, the service can request input from the user indicating whether the user prefers to use other types of resources to satisfy the deadline or to allow the deadline to pass and schedule the workload at a later time.

Figure 4B:
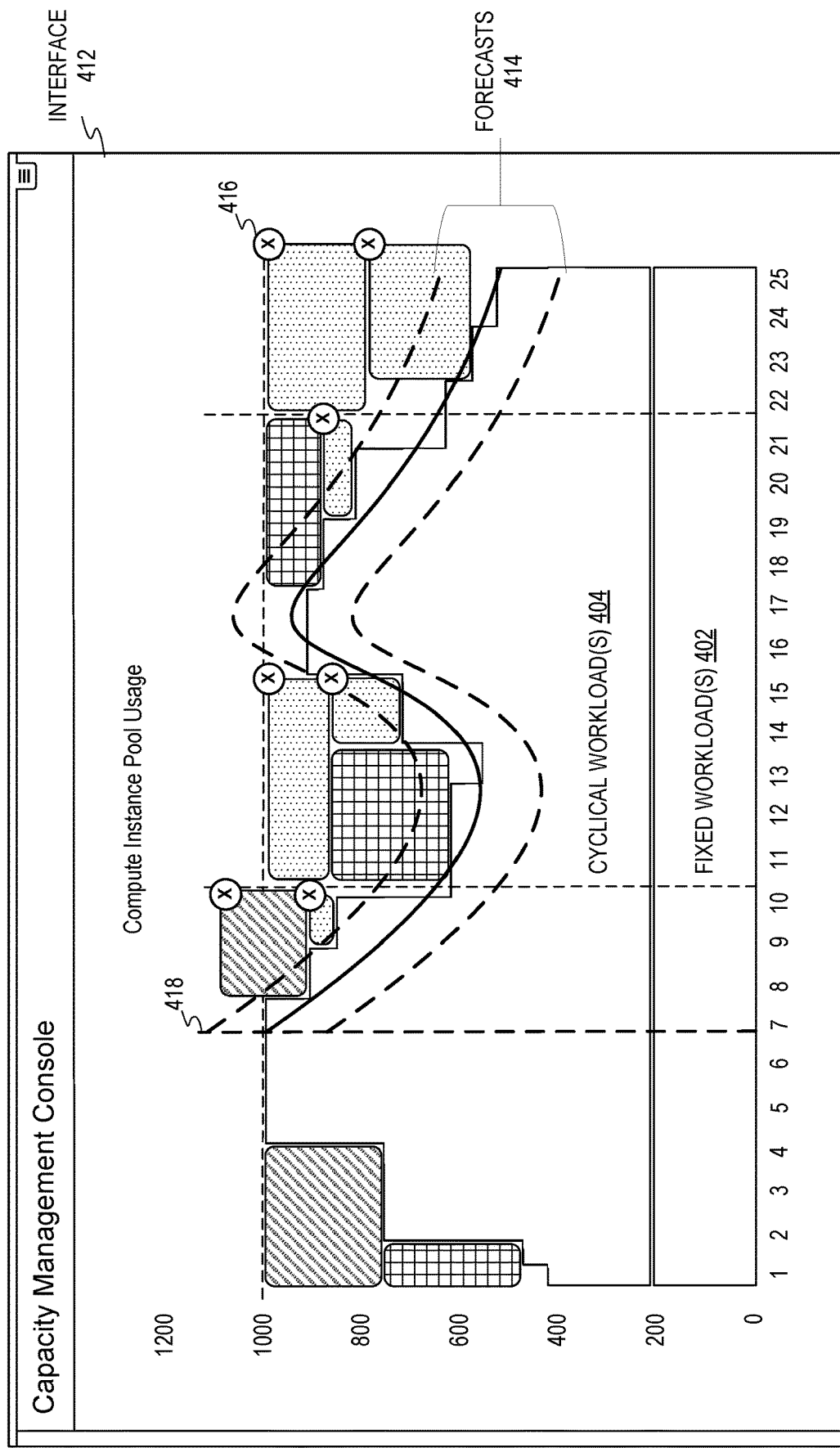
FIG. 4B is an example graphical user interface (GUI) enabling users to manage scheduled uses of compute capacity provided by a compute instance pool according to some embodiments.

In some embodiments, a capacity forecasting and scheduling service 126 can provide various GUIs that display information indicating historical capacity usage by the user's workloads and scheduled usage of capacity in the future, and further enable users to make modifications to proposed capacity schedules. FIG. 4B, for example, illustrates an example graphical user interface (GUI) enabling users to manage scheduled uses of compute capacity provided by a compute instance pool according to some embodiments. For example, the interface 412 shown in FIG. 4B is an example interactive GUI that enables users to view and modify capacity scheduling details related to the users' resources and workloads. As illustrated, the interface 412 includes a line 418 indicating a current point in time, where workloads shown to the left of the line are based on historical data about usage of the associated compute instance pool and workloads shown to the right of the line represent predicted and/or scheduled uses of resources of the pool.

In some embodiments, the interface 412 further includes a forecast graph 414 illustrating forecasted use of the compute instance pool by one or more the workloads with various margins of error (for example, separate graphed lines indicating various percentiles). The forecasted use (e.g., number of compute instances or other virtual resources over time) can be generated in some implementations using a machine learning model, as described herein. A user can use the visualized forecasts and percentiles, for example, to help determine how likely it is for various scheduled uses of capacity to be satisfied by resources in the pool without resorting to other types of capacity. In some embodiments, users can provide input specifying an amount of error a user is willing to accept when scheduling decisions are made such that a tradeoff can be made between accuracy of the forecast and a likelihood that scheduled uses of capacity are able to be satisfied entirely by capacity from the resource pool. In this regard, the user may be able to select one of the percentile lines representing an acceptable margin of error from the forecasted usage, and other jobs can be scheduled according to the predicted unused capacity at the selected percentile.

In some embodiments, a user can provide various types of input to an interactive capacity scheduling GUI to modify scheduled uses of compute instance pool capacity. For example, the types of input can include input specifying a different time at which to execute one or more workloads, input specifying a different priority to be assigned to one or more workloads, input requesting to cancel the scheduled use of the number of available compute instances of the compute instance pool by one or more workloads (for example, using an interface element 416 to cancel a scheduled use), input to adjust a number of compute instances scheduled for use by a workload in the future (for example, to increase or decrease a scheduled number of compute instances based on a margin of error the user is willing to accept), an execution deadline to be associated with one or more workloads, and so forth. In the example of FIG. 4B, a user can use the GUI to select graphical elements (for example, the rectangular boxes in the graph) representing past uses of a compute instance pool by particular workloads to obtain additional information about the use (for example, how long the execution lasted, how many compute instances were actually used, whether there were any insufficient capacity exceptions or other errors, and so forth).

In some embodiments, a user can also select graphical elements representing scheduled uses of compute capacity to move a scheduled use to a different time (for example, by dragging and dropping the graphical element to a different location in the graph, where the interface can automatically fit the graphical element into available capacity if possible and/or reschedule other jobs if needed to accommodate the user-requested rescheduling), to change a workload's priority (for example, by selecting the box and specifying a different priority or dragging and dropping the position of a graphical element relative to other workloads), to cancel a scheduled use (for example, by selecting an interface element 416 to delete a workload icon), to add or modify deadlines (for example, by adding and dragging deadline bars along the graph's timeline), among other possible interactions. In some embodiments, the ability to make such modifications via the GUI can be based on whether a user has sufficient permissions to make such changes to workloads, as described above, where a use may have sufficient permissions to modify some workloads but not others.

Referring again to FIG. 1, in some embodiments, at circle "5" the capacity forecasting and scheduling service 126 causes execution and scaling of workloads according to the performed scheduling processes. For example, the capacity forecasting and scheduling service 126 can send scaling instructions to a hardware virtualization service 102 or other system component that manages the compute instance pool 124, associated auto scaling groups, and other capacity-related components. In FIG. 1, for example, the capacity forecasting and scheduling service 126 can send instructions to the hardware virtualization service 102 instructing the service to either increase or decrease a number of compute instances available to each of the workloads 128A-128N, assuming that the capacity forecasting and scheduling service 126 determines that scaling is appropriate. In one example, the capacity forecasting and scheduling service 126 causes the hardware virtualization service 102 to increase or decrease a number of compute instances associated with each of one or more auto scaling groups.

As indicated above, a capacity forecasting and scheduling service 126 can help users and organizations of users share computing resources among any number of separate workloads. In some embodiments, a capacity forecasting and scheduling service 126 can further analyze use of computing resources more broadly across users and organizations of users of the service provider network 100. For example, a capacity forecasting and scheduling service 126 may analyze auto scaling groups being used by many different user accounts in a region to monitor for periods of high and low utilization across all available compute capacity. In some embodiments, the broader monitoring and analysis of computing resource usage can enable a capacity forecasting and scheduling service 126 to possibly move user workloads between compute resource pools associated with different user accounts that may not be directly associated with one another, for example, if the service can be sufficiently confident enough that the resources will go unused by one or more user accounts. As another example, a capacity forecasting and scheduling service 126 can schedule workloads that users have indicated have flexible execution deadlines in a manner that better ensures that enough capacity is available for all users in a region. The ability to better utilize available resources and predict future resource usage generally can enable a service provider network 100 to better avoid situations in which users request capacity but the provider network cannot satisfy the request.

Although many of the examples herein are described in the context of workloads executing using compute resources of a service provider network 100, in general, the workload scheduling techniques can be used in any computing environment including service provider networks, on-premises environments, or combinations thereof. For example, a user's on-premises compute instances can collect and send utilization metrics to a data monitoring service 136 of a service provider network 100, and capacity forecasting and scheduling service 126 of the service provider network or the user's on-premises environment can obtain the metrics from the data monitoring service and make scaling decisions based on the obtained metrics.

Figure 5:
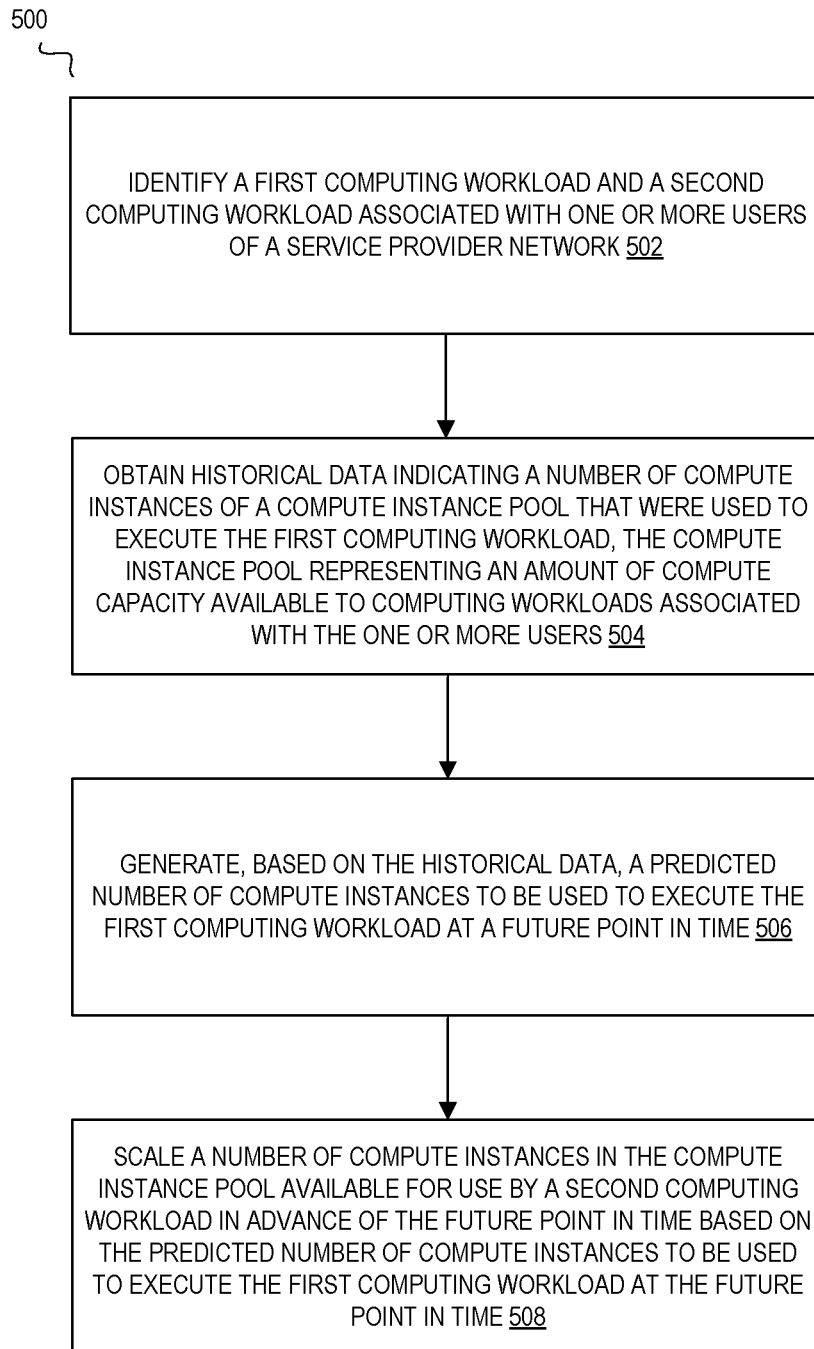
FIG. 5 is a flow diagram illustrating operations of a method for allocating computing resources provided by a computing resource pool among two or more separate computing workloads according to some embodiments.
Figure 6:
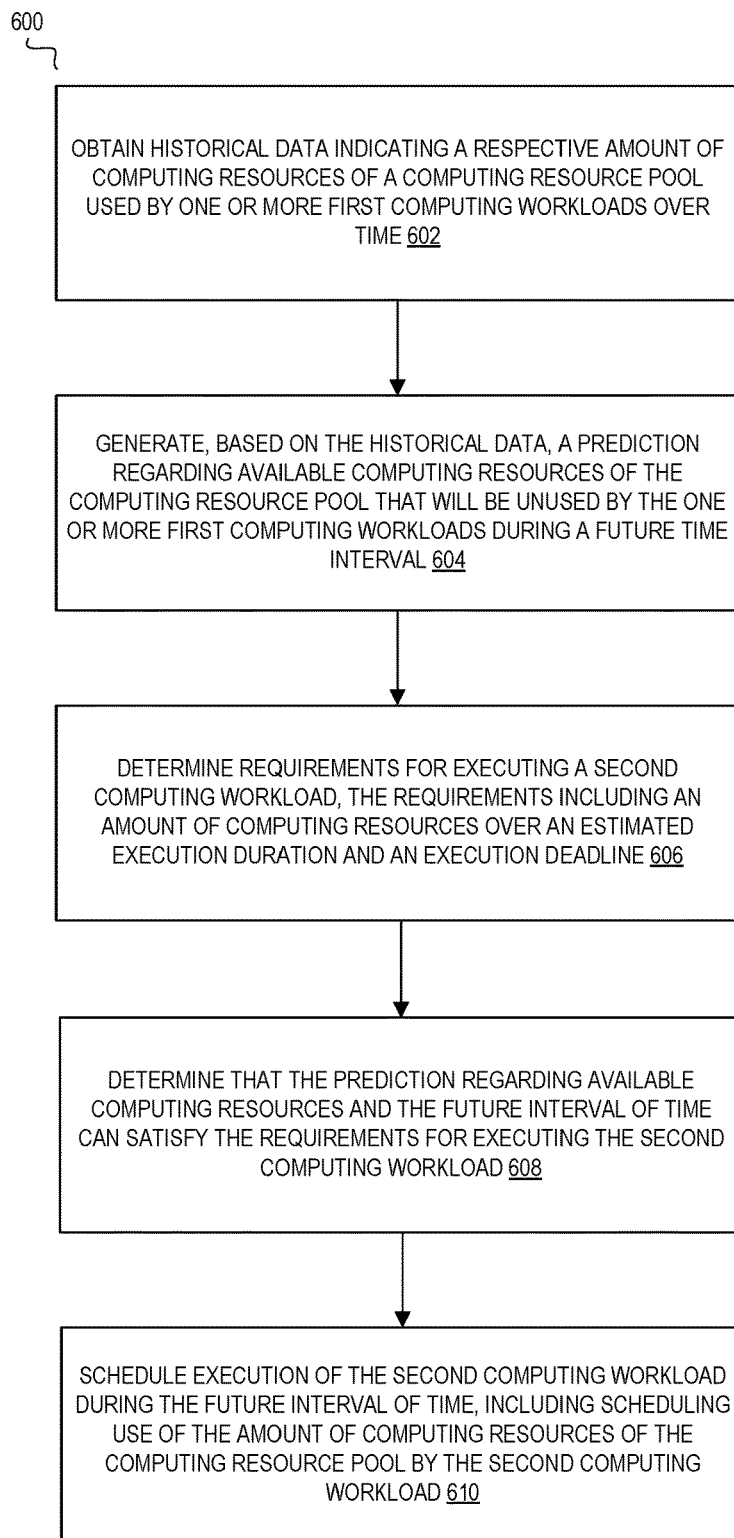
FIG. 6 is a flow diagram illustrating operations of a method for allocating computing resources provided by a computing resource pool among two or more separate computing workloads including at least one deadline-driven workload according to some embodiments.
Figure 7:
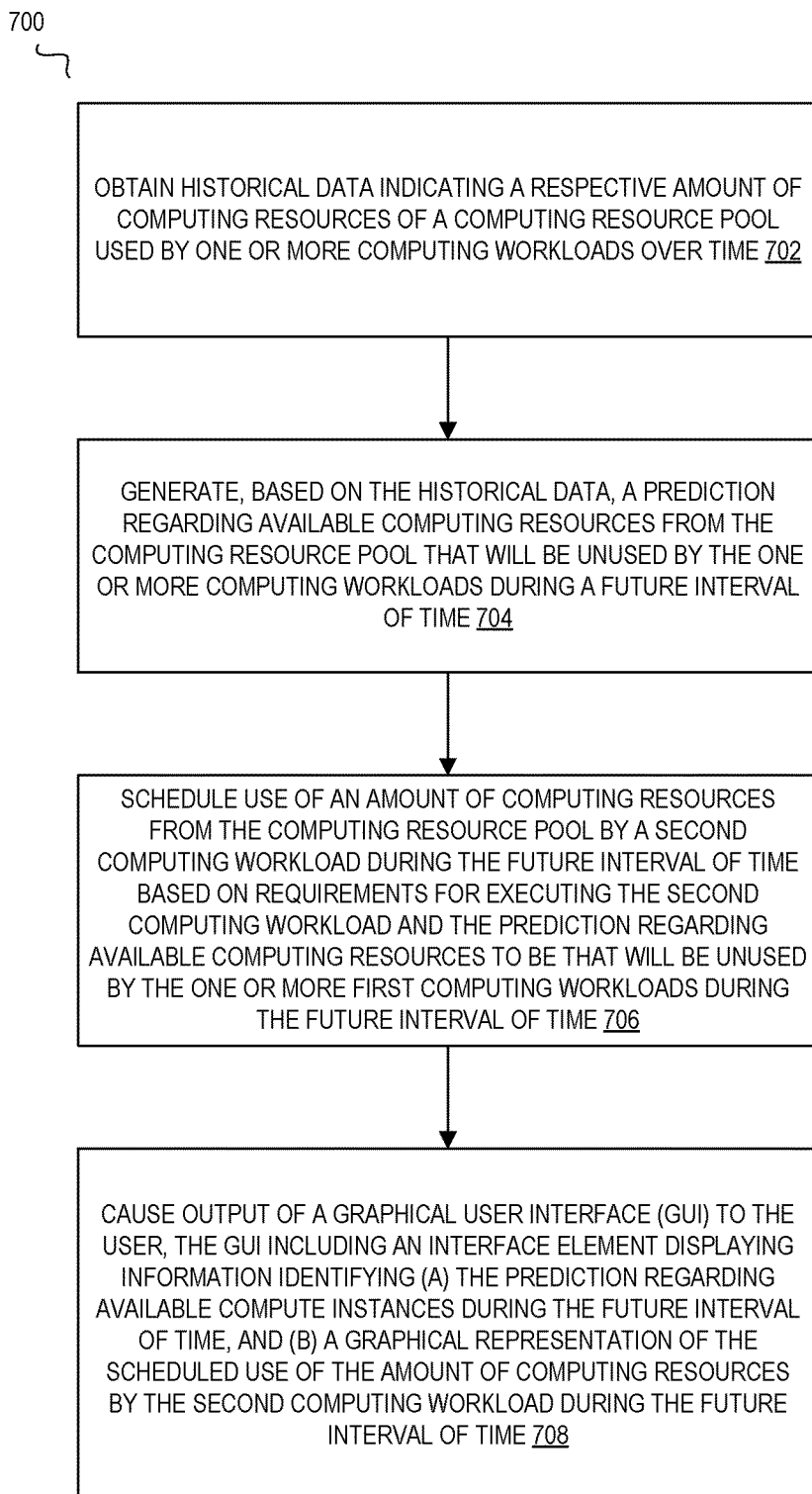
FIG. 7 is a flow diagram illustrating operations of a method for causing display of a graphical user interface (GUI) that enables users to configure the allocation of computing resources provided by a computing resource pool among computing workloads associated with a user or group of users according to some embodiments.

FIG. 5 is a flow diagram illustrating operations 500 of a method for allocating computing resources provided by a computing resource pool among two or more separate computing workloads according to some embodiments. FIG. 6 is a flow diagram illustrating operations 600 of a method for allocating computing resources provided by a computing resource pool among two or more separate computing workloads including at least one deadline-driven workload according to some embodiments. FIG. 7 is a flow diagram illustrating operations 700 of a method for causing display of a graphical user interface (GUI) that enables users to configure the allocation of computing resources provided by a computing resource pool among computing workloads associated with a user or group of users according to some embodiments. Some or all the operations 500, 600, and 700 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500, 600, or 700 are performed by a capacity forecasting and scheduling service 126, hardware virtualization service 102, or other components of the other figures or combinations thereof.

Referring to FIG. 5, the operations 500 include, at block 502, identifying a first computing workload and a second computing workload associated with one or more users of a service provider network.

The operations 500 further include, at block 504, obtaining historical data indicating a number of compute instances of a compute instance pool that were used to execute the first computing workload, the compute instance pool representing an amount of compute capacity reserved for use by the one or more users. In some embodiments, the compute instance pool includes a fixed number of compute instances, and wherein the first computing workload uses a varying number of compute instances of the compute instance pool over time. As illustrated in FIG. 2, for example, a workload may exhibit a cyclical or pattern of use of a compute instance pool over time. In some embodiments, execution of the first computing workload is managed by one or more a batch processing service, a container execution service, a MapReduce service, and a queue service.

In some embodiments, the compute instance pool includes a plurality of VM instances or a plurality of container instances. In some embodiments, execution of the first computing workload is based on one or more of a VM image, a container, a script, and an executable software application.

The operations 500 further include, at block 506, generating, based on the historical data, a predicted number of compute instances to be used to execute the first computing workload at a future point in time. In some embodiments, the predicted number of compute instances to be used to execute the first computing workload at the one or more future points in time is generated using an RNN trained based on historical data related to the compute instance pool, where the historical data used to train the RNN may or may not overlap with the data historical data indicating the number of compute instances of the compute instance pool used to execute a first computing workload described above.

The operations 500 further include, at block 508, scaling a number of compute instances in the compute instance pool available for use by a second computing workload in advance of the future point in time based on the predicted number of compute instances to be used to execute the first computing workload at the future point in time. In some embodiments, the second computing workload is associated with an expected execution duration and an execution deadline, and wherein the operations further include increasing a number of compute instances in the compute instance pool available for use by the second computing workload at a point in time that is determined based on at least one of the excepted execution duration, the execution deadline, and the predicted number of compute instances to be used to execute the first computing workload at the one or more future points in time.

In some embodiments, at least one of the first computing workload and the second computing workload is associated with an auto scaling group, wherein the auto scaling group defines a set of compute instances available for use by a respective workload.

In some embodiments, the first computing workload and the second computing workload are associated with users that are part of a same organization. For example, each of the users may be employees of a same business organization, part of separate development teams or divisions of an organization, and the like.

In some embodiments, a time at which the number of compute instances in the compute instance pool available for use by the second computing workload is decreased is determined in part based on information indicating an amount of warm-up time associated with the first computing workload.

In some embodiments, the operations further include causing display of a GUI displaying a representation of the historical data indicating a number of compute instances of a compute instance pool used to execute the first computing workload.

Referring to FIG. 6, the operations 600 include, at block 602, obtaining historical data indicating a respective amount of computing resources of a computing resource pool used by one or more first workloads over time. In some embodiments, the computing resource pool includes a fixed amount of computing resources, and the first computing workload uses a varying amount of computing resources from the computing resource pool over time. In some embodiments, execution of the first computing workload is managed by one of a batch processing service, a container execution service, a MapReduce service, and a queue service. In some embodiments, execution of the first computing workload is based on one or more of a VM image, a container, a script, and an executable software application.

The operations 600 further include, at block 604, generating, based on the historical data, a prediction regarding available computing resources of the computing resource pool that will be unused by the one or more first computing workloads during a future interval of time. In some embodiments, the predicted amount of computing resources to be used to execute the first computing workload at the one or more future points in time is generated using a RNN trained based on historical data related to the compute instance pool, where the historical data used to train the RNN may or may not overlap with the data historical data indicating the number of compute instances of the compute instance pool used to execute a first computing workload described above.

The operations 600 further include, at block 606, determining requirements for executing a second computing workload, the requirements including an amount of computing resources over an estimated execution duration and an execution deadline.

The operations 600 further include, at block 608, determining that the prediction regarding available computing resources and the future interval of time can satisfy the requirements for executing the second computing workload.

The operations 600 further include, at block 610, scheduling execution of the second computing workload during the future interval of time, including scheduling use of the amount of computing resources of the computing resource pool by the second computing workload. In some embodiments, the second computing workload is one of a plurality of second computing workloads associated with a plurality of respective estimated execution durations and a plurality of respective execution deadlines, and wherein the scheduling is based on the predicted amount of computing resources, the plurality of respective estimated execution durations, and the plurality of respective execution deadlines. In some embodiments, the computing resource pool is a compute instance pool, and the compute instance pool includes a plurality of VM instances or a plurality of container instances.

In some embodiments, the operations further include scaling an amount of computing resources from the computing resource pool used by a third computing workload that is not associated with an execution deadline based on the amount of computing resources used by the one or more first computing workloads and the second computing workload over time.

In some embodiments, the scheduling of the amount of computing resources of the computing resource pool to be used in the future by the second computing workload is determined in part by information indicating an amount of warm-up time associated with the first computing workload. In some embodiments, the operations further include scheduling use of an amount of computing resources of the computing resource pool by a third computing workload during a time period in the future, wherein the scheduling is based in part on respective priorities assigned to the second computing workload and the third computing workload.

In some embodiments, the first computing workload and the second computing workload are associated with users that are part of a same organization. In some embodiments, the operations further include causing display of a GUI displaying a representation of the historical data indicating a respective amount of computing resources of the computing resource pool used by the one or more first workloads over time.

Referring to FIG. 7, the operations 700 include, at block 702, obtaining historical data indicating a respective amount of computing resources of a computing resource pool used by one or more computing workloads over time. In some embodiments, the computing resource pool comprises a compute instance pool including a fixed number of compute instances, and wherein the first computing workload uses a varying number of compute instances of the compute instance pool over time. In some embodiments, execution of the first computing workload is managed by one of a batch processing service, a container execution service, a MapReduce service, and a queue service. In some embodiments, the computing resource pool is a compute instance pool, wherein the compute instance pool includes a plurality of virtual machine (VM) instances or a plurality of container instances.

The operations 700 further include, at block 704, generating, based on the historical data, a prediction regarding available computing resources from the computing resource pool that will be unused by the one or more first computing workloads during a future interval of time. In some embodiments, the predicted amount of computing resources to be used for the first computing workload at the one or more future points in time is generated using a recurrent neural network (RNN) trained based on at least a portion of the historical data.

The operations 700 further include, at block 706, scheduling use of an amount of computing resources from the computing resource pool by a second computing workload during the future interval of time based on requirements for executing the second computing workload and the prediction regarding available computing resources that will be unused by the one or more first computing workloads during the future interval of time. In some embodiments, the second computing workload is one of a plurality of second computing workloads associated with a plurality of respective estimated execution durations and a plurality of respective execution deadlines, and wherein the scheduling is based on the predicted amount of computing resources, the plurality of respective estimated execution durations, and the plurality of respective execution deadlines.

The operations 700 further include, at block 708, causing output of a graphical user interface (GUI) for display to the user, the GUI including an interface element displaying information identifying (a) the prediction regarding available compute instances during the future interval of time, and (b) a graphical representation of the scheduled use of the amount of computing resources by the second computing workload during the future interval of time. In some embodiments, at least one of the first computing workload and the second computing workload is associated with an auto scaling group, wherein the auto scaling group defines an amount of computing resources available to a respective computing workload.

In some embodiments, the operations further comprise receiving input, via the GUI, to modify the scheduled use of the amount of available computing resources of the computing resource pool in the future by the second computing workload, the input specifying one or more of: a different time at which to execute the second computing workload, a different priority to be assigned to the second computing workload, cancellation of the scheduled use of the amount of computing resources by the second computing workload, an execution deadline to be associated with the second computing workload.

In some embodiments, the GUI further displays one or more suggested modifications to the scheduled use of the amount of computing resources from the computing resource pool by the second computing workload of the one or more computing workloads.

In some embodiments, the operations further include determining that a scheduled use of a number of available compute instances of the compute instance pool in the future by at least one particular computing workload of the one or more computing workloads is expected to exceed a total capacity available in the compute instance pool; and sending a notification to a user indicating that the scheduled use is expected to exceed the total capacity available in the compute instance pool.

In some embodiments, the first computing workload and the second computing workload are associated with users that are part of a same organization.

Figure 8:
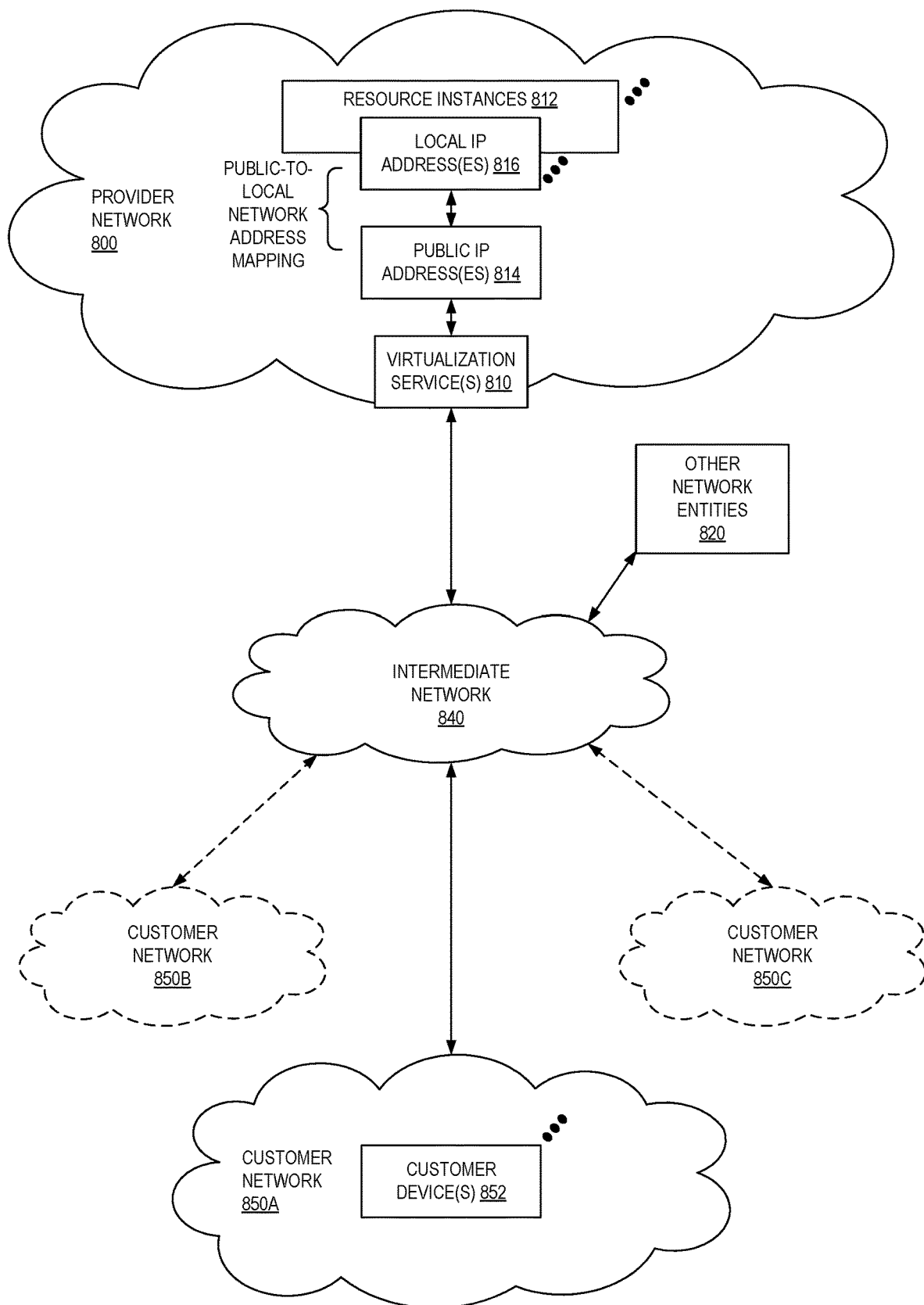
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (for example, Internet Protocol version 4 (IPv4) or Internet Protocol version 6 (IPv6) addresses) that customers may obtain from the provider 800.

Conventionally, the provider network 800, via the virtualization services 810, may allow a customer of the service provider (for example, a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
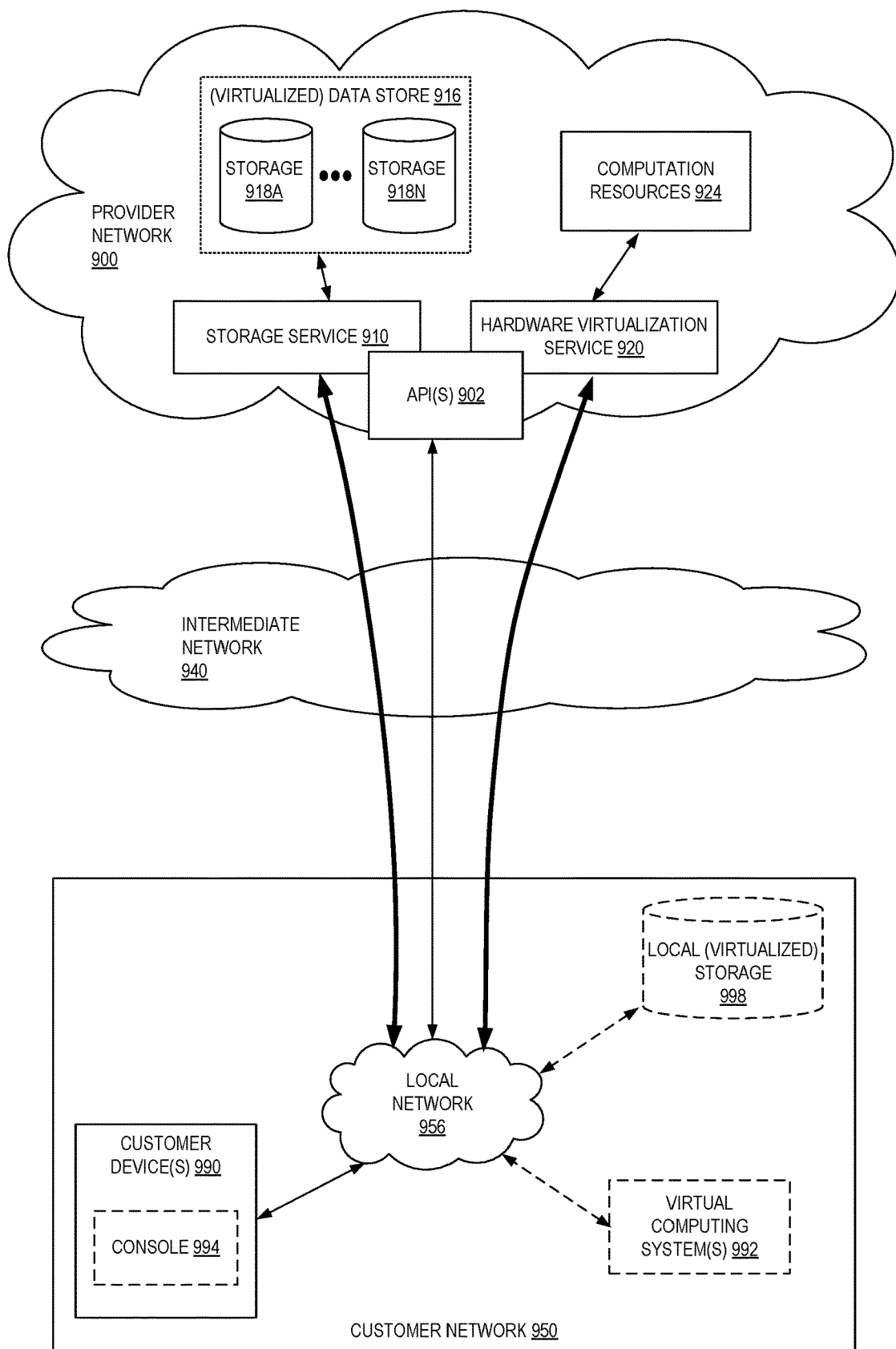
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (for example, VMs) to customers. The computation resources 924 may, for example, be rented or leased to customers of the provider network 900 (for example, to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (for example, a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (for example, via console 994), the customer may access the functionality of storage service 910, for example via one or more APIs 902, to access data from and store data to storage resources 918A-918N of a virtual data store 916 (for example, a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
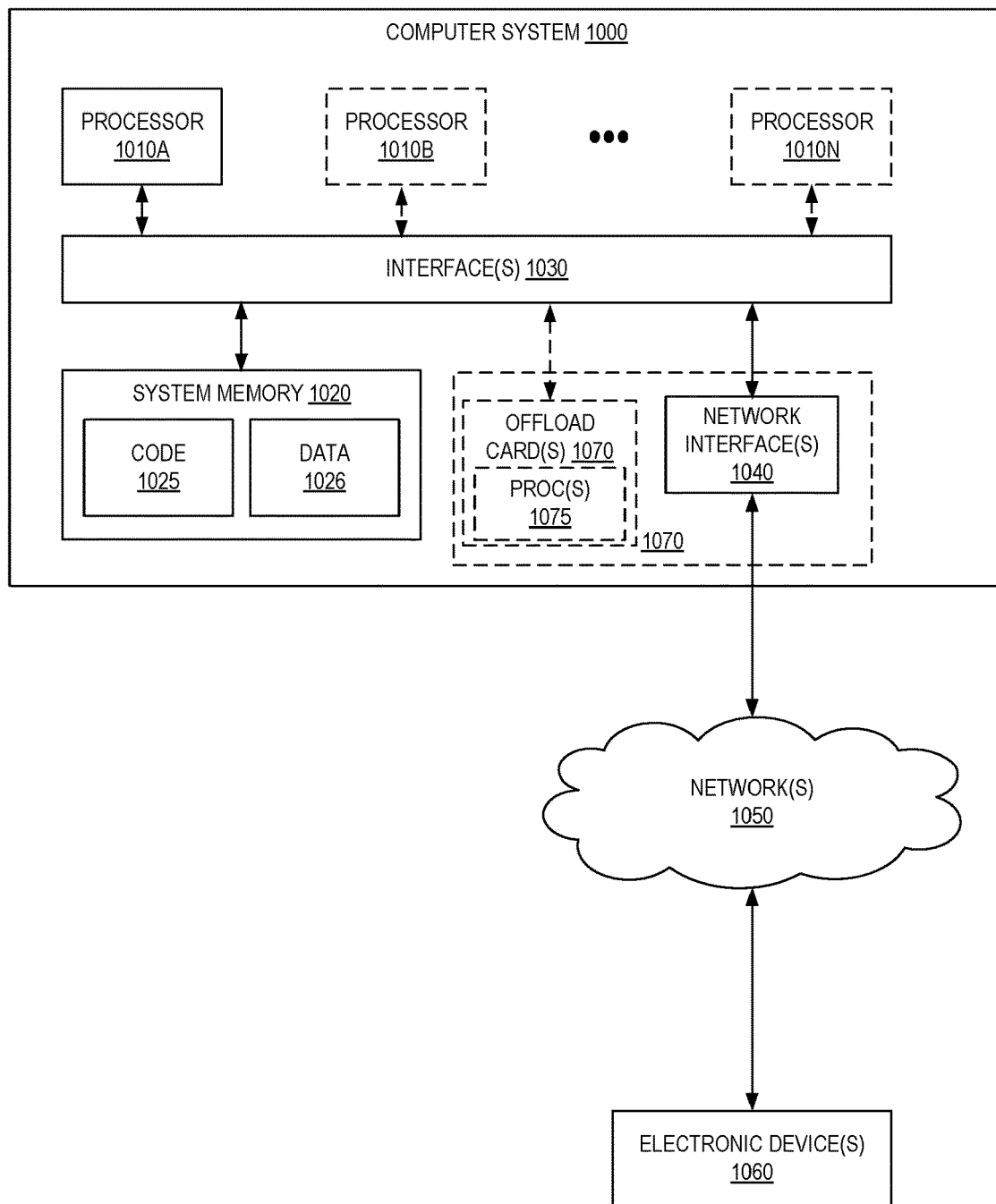
FIG. 10 is a block diagram illustrating an example computer system that may be used in some embodiments.

In some embodiments, a system that implements a portion or all of the techniques for optimizing the allocation of computing resources provided by a service provider network among computing workloads associated with a user or group of users of the service provider network as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (for example, two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In some embodiments, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (for example, system memory 1020) into a format suitable for use by another component (for example, processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (for example, operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (for example, upon a request from a hypervisor) that is executed by the other processors 1010A-1010N of the computer system 1000. However, in some embodiments the virtualization manager implemented by the offload card(s) 1070 can accommodate requests from other entities (for example, from compute instances themselves), and may not coordinate with (or service) any separate hypervisor.

In some embodiments, system memory 1020 may be some embodiments of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 1000 via I/O interface 1030. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "some embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining historical data indicating a respective number of compute instances of a compute instance pool used by at least one first computing workload over time, wherein the compute instance pool includes a number of reservations of compute capacity for computing workloads associated with a user or an organization of users of a service provider network, and wherein the compute capacity is reserved by the user or organization of users for a duration of a reservation term;

generating, based on the historical data, a prediction regarding available compute instances of the compute instance pool that will be unused by the at least one first computing workload during a future interval of time;

scheduling, based on requirements for executing a second computing workload and the prediction regarding available compute instances, use of at least some of the available compute instances for executing the second computing workload during the future interval of time;

causing output of a graphical user interface (GUI) for display to the user, wherein the GUI includes display of a graph identifying (a) the prediction regarding available compute instances during the future interval of time, and (b) a graphical representation of the scheduled use of the at least some of the available compute instances by the second computing workload during the future interval of time;

receiving, via the same GUI displaying the graph, input requesting to modify the scheduled use of the at least some of the available compute instances by the second computing workload during the future interval of time, wherein the input includes a selection of an interface element representing the second computing workload in the graph; and modifying the scheduled use of the at least some of the available compute instances by the second computing workload.

2. The computer-implemented method of claim 1, wherein the input requesting to modify the scheduled use of the at least some of the available compute instances by the second computing workload during the future interval of time indicates one or more of: a time at which to execute the second computing workload, a priority to be assigned to the second computing workload, cancellation of the scheduled use of at least some of the available compute instances of the compute instance pool by the second computing workload, or an execution deadline to be associated with the second computing workload.

3. The computer-implemented method of claim 1, wherein the at least one first computing workload uses a varying number of compute instances of the compute instance pool over time.

4. A computer-implemented method comprising:
obtaining historical data indicating a respective amount of computing resources of a computing resource pool used by at least one first computing workload over time, wherein the computing resource pool includes a number of reservations of compute capacity for computing workloads associated with a user or an organization of users of a service provider network, and wherein the compute capacity is reserved by the user or organization of users for a duration of a reservation term;

generating, based on the historical data, a prediction regarding available computing resources from the computing resource pool that will be unused by the at least one first computing workload during a future interval of time;

scheduling use of an amount of computing resources from the computing resource pool by a second computing workload during the future interval of time based on requirements for executing the second computing workload and the prediction regarding available computing resources that will be unused by the at least one first computing workload during the future interval of time;

causing output of a graphical user interface (GUI) for display to the user, wherein the GUI includes display of a graph identifying (a) the prediction regarding available compute instances during the future interval of time, and (b) a graphical representation of the scheduled use of the amount of computing resources by the second computing workload during the future interval of time;

receiving, via the same GUI displaying the graph, input requesting to modify the scheduled use of the amount of computing resources by the second computing workload during the future interval of time, wherein the input includes a selection of an interface element representing the second computing workload in the graph; and modifying the scheduled use of the amount of computing resources by the second computing workload.

5. The computer-implemented method of claim 4, wherein the input requesting to modify the scheduled use of the amount of computing resources by the second computing workload during the future interval of time indicates one or more of: a time at which to execute the second computing workload, a priority to be assigned to the second computing workload, cancellation of the scheduled use of the amount of computing resources by the second computing workload, or an execution deadline to be associated with the second computing workload.

6. The computer-implemented method of claim 4, wherein the at least one first computing workload uses a varying amount of computing resources from the computing resource pool over time.

7. The computer-implemented method of claim 4, wherein a computing workload of the at least one first computing workload is associated with an auto scaling group, and wherein the auto scaling group scales an amount of computing resources available to the computing workload over time.

8. The computer-implemented method of claim 4, wherein execution of the at least one first computing workload is managed by one of a batch processing service, a container execution service, a MapReduce service, or a queue service.

9. The computer-implemented method of claim 4, further comprising generating the prediction using a recurrent neural network (RNN) trained based on at least a portion of the historical data indicating the respective amount of computing resources of the computing resource pool used by the at least one first computing workload over time.

10. The computer-implemented method of claim 4, wherein the computing resources of the computing resource pool used by the at least one first computing workload over time include at least one of: virtual machine (VM) instances or containers.

11. The computer-implemented method of claim 4, wherein the second computing workload is one of a plurality of second computing workloads associated with a plurality of respective estimated execution durations and a plurality of respective execution deadlines, and wherein the scheduling is based on the prediction regarding available computing resources, the plurality of respective estimated execution durations, and the plurality of respective execution deadlines.

12. The computer-implemented method of claim 4, wherein the computing resource pool is a first computing resource pool, wherein the organization of users is associated with a plurality of computing resource pools including the first computing resource pool, and wherein the second computing workload uses computing resources from a second computing resource pool.

13. The computer-implemented method of claim 4, further comprising:
   determining that a scheduled use of an amount of available computing resources of the computing resource pool in the future by at least one particular computing workload of the at least one first computing workload is expected to exceed a total capacity available in the computing resource pool; and
   sending a notification to a user indicating that the scheduled use is expected to exceed the total capacity available in the computing resource pool.

14. The computer-implemented method of claim 4, wherein the GUI further displays one or more suggested modifications to the scheduled use of the amount of computing resources from the computing resource pool by the second computing workload.

15. A system comprising:
   a capacity forecasting and scheduling service implemented by a first one or more electronic devices, the capacity forecasting and scheduling service including instructions that upon execution cause the capacity forecasting and scheduling service to:
      obtain historical data indicating a respective number of compute instances of a compute instance pool used by at least one first computing workload over time, wherein the compute instance pool includes a number of reservations of compute capacity for computing workloads associated with a user or an organization of users of a service provider network, and wherein the compute capacity is reserved by the user or organization of users for a duration of a reservation term;
      generate, based on the historical data, a prediction regarding available compute instances of the compute instance pool that will be unused by the at least one first computing workload during a future interval of time;
      schedule, based on requirements for executing a second computing workload and the predicting regarding available compute instances, use of at least some of the available compute instances for executing the second computing workload during the future interval of time;
      cause output of a graphical user interface (GUI) for display to the user, wherein the GUI includes display of a graph identifying (a) the prediction regarding available compute instances during the future interval of time, and (b) a graphical representation of the scheduled use of the at least some of the available compute instances by the second computing workload during the future interval of time;
      receive, via the same GUI displaying the graph, input requesting to modify the scheduled use of the at least some of the available compute instances by the second computing workload during the future interval of time, wherein the input includes a selection of an interface element representing the second computing workload in the graph; and
      modify the scheduled use of the at least some of the available compute instances by the second computing workload; and
   a hardware virtualization service implemented by a second one or more electronic devices, the hardware virtualization service including instructions that upon execution cause the hardware virtualization service to execute the second computing workload using the available compute instances during the future interval of time.

16. The system of claim 15, wherein the input requesting to modify the scheduled use of the at least some of the available compute instances by the second computing workload during the future interval of time indicates one or more of: a time at which to execute the second computing workload, a priority to be assigned to the second computing workload, cancellation of the scheduled use of the number of compute instances by the second computing workload, or an execution deadline to be associated with the second computing workload.

17. The system of claim 15, wherein the at least one first computing workload uses a varying number of compute instances of the compute instance pool over time.

18. The system of claim 15, wherein a computing workload of the at least one first computing workload is associated with an auto scaling group, wherein the auto scaling group scales an amount of computing resources available to the computing workload over time.

19. The system of claim 15, wherein execution of the at least one first computing workload is managed by one of a batch processing service, a container execution service, a MapReduce service, or a queue service.

20. The system of claim 15, further comprising generating the prediction using a recurrent neural network (RNN) trained based on at least a portion of the historical data indicating the respective number of compute instances of the compute instance pool used by the at least one first computing workload over time.

* * * * *